US008252138B2

(12) United States Patent
Moronuki et al.

(10) Patent No.: US 8,252,138 B2
(45) Date of Patent: Aug. 28, 2012

(54) THERMOSENSITIVE MULTIPLE RECORDING SHEET AND METHOD FOR PRODUCING THE SAME

(75) Inventors: Katsumi Moronuki, Tokyo (JP); Kenji Ikegami, Shizuoka-ken (JP); Hiroaki Mikamo, Tokyo (JP); Natsuki Terashima, Tokyo (JP)

(73) Assignees: Oji Paper Co., Ltd., Tokyo (JP); Oji Specialty Paper Co., Ltd., Tokyo (JP); Oji Packaging Co., Ltd., Tokyo (JP)

( * ) Notice: Subject to any disclaimer, the term of this patent is extended or adjusted under 35 U.S.C. 154(b) by 960 days.

(21) Appl. No.: 11/722,798

(22) PCT Filed: Dec. 26, 2005

(86) PCT No.: PCT/JP2005/023811

§ 371 (c)(1),
(2), (4) Date: Jun. 25, 2007

(87) PCT Pub. No.: WO2006/070759

PCT Pub. Date: Jul. 6, 2006

(65) Prior Publication Data

US 2010/0003467 A1 Jan. 7, 2010

(30) Foreign Application Priority Data

| | | |
|---|---|---|
| Dec. 27, 2004 | (JP) | 2004-376251 |
| Feb. 17, 2005 | (JP) | 2005-039951 |
| Mar. 25, 2005 | (JP) | 2005-088781 |
| Apr. 8, 2005 | (JP) | 2005-111890 |
| Apr. 12, 2005 | (JP) | 2005-114261 |

(51) Int. Cl.

| | |
|---|---|
| ***B41M 3/12*** | (2006.01) |
| ***B29C 65/52*** | (2006.01) |
| ***B32B 37/12*** | (2006.01) |
| ***B32B 37/14*** | (2006.01) |
| ***B32B 38/14*** | (2006.01) |
| ***B32B 27/30*** | (2006.01) |
| ***B32B 27/16*** | (2006.01) |
| *B41M 3/14* | (2006.01) |
| *B32B 37/16* | (2006.01) |

(52) U.S. Cl. ........ 156/280; 156/277; 156/278; 427/146; 427/148; 427/152

(58) Field of Classification Search .......... 156/277–280; 427/146–153
See application file for complete search history.

(56) References Cited

U.S. PATENT DOCUMENTS 3,716,439 A * 2/1973 Maeda .......................... 156/269
(Continued)

FOREIGN PATENT DOCUMENTS

EP 1279492 A2 * 1/2003
(Continued)

OTHER PUBLICATIONS

English Translation of JP 2001-225548; Takada et al.—Aug. 21, 2001.*

(Continued)

*Primary Examiner* — Sonya Mazumdar
(74) *Attorney, Agent, or Firm* — Knobbe Martens Olson & Bear LLP

(57) ABSTRACT

The present invention provides a thermosensitive multiple recording sheet characterized in that a second base material having light transmission properties is attached to the side of a first thermosensitive recording layer of a first thermosensitive recording sheet comprising a first base material and the first thermosensitive recording layer formed on one surface of the first base material, through a temporary adhesive layer, the second base material is composed of an information disclosing portion and an information non-disclosing portion, a shielding layer is formed at the position corresponding to the information non-disclosing portion on the second base material, and an ultraviolet curable resin layer are formed as an outermost layer of the sheet.

12 Claims, 7 Drawing Sheets

U.S. PATENT DOCUMENTS

| | | | | | |
|---|---|---|---|---|---|
| 5,432,534 | A * | 7/1995 | Maruyama et al. | 347/172 |
| 6,248,432 | B1 * | 6/2001 | Moronuki et al. | 428/32.22 |
| 6,308,630 | B1 * | 10/2001 | Kurokawa et al. | 101/492 |
| 2002/0011171 | A1 * | 1/2002 | Usui | 101/494 |
| 2006/0191433 | A1 * | 8/2006 | Date et al. | 101/463.1 |

FOREIGN PATENT DOCUMENTS

| | | | | |
|---|---|---|---|---|
| JP | S48-47844 | | | 7/1973 |
| JP | S49-73144 | | | 7/1974 |
| JP | S49-98640 | | | 9/1974 |
| JP | S49-133041 | | | 12/1974 |
| JP | S50-14351 | | | 2/1975 |
| JP | S50-68143 | | | 6/1975 |
| JP | S50-160048 | | | 12/1975 |
| JP | 52-115229 | | | 9/1977 |
| JP | 54-001041 | | | 1/1979 |
| JP | 57-012693 | A | | 1/1982 |
| JP | UM-A-02-069359 | | | 5/1990 |
| JP | 02178093 | A | * | 7/1990 |
| JP | 03234598 | A | * | 10/1991 |
| JP | 06305257 | A | * | 11/1994 |
| JP | 3046499 | U | | 12/1997 |
| JP | A-10-075326 | | | 3/1998 |
| JP | A-2001-180123 | | | 7/2001 |
| JP | A-2001-225548 | | | 8/2001 |
| JP | A-2002-144768 | | | 5/2002 |
| JP | A-2003-103741 | | | 4/2003 |
| JP | A-2003-127263 | | | 5/2003 |
| JP | A-2004-051663 | | | 2/2004 |
| JP | A-2004-098487 | | | 4/2004 |
| JP | A-2006-082237 | | | 3/2006 |

OTHER PUBLICATIONS

English Translation of JP 2003-127263; Ono—May 8, 2003.*
English Translation of JP 06-305257; Moronuki et al.—Nov. 1994.*
Family Search Report of CN1703716; Nov. 30, 2005.*
Family Search Report of JP2003-103741; Apr. 2, 2004.*
English translation of JP2001-180123; Jul. 3, 2001.*
English translation of JP2004-051663; Feb. 19, 2004.*
English translation of JP2004-098487; Apr. 2, 2004.*
English translation of JP2006-550771; retrieved Nov. 9, 2011.*
Covertech, Aug. 1995, 46-49.
Office Action issued in counterpart Japanese Patent Application No. 2005-115512, dated Jul. 20, 2010.
Notification (Information Statement) issued in related Japanese Patent Application No. 2006-550771, dated Sep. 7, 2010.
Office Action issued in corresponding Japanese Patent Application No. 2006-550771 mailed Jul. 5, 2011.

* cited by examiner

THERMOSENSITIVE MULTIPLE RECORDING SHEET AND METHOD FOR PRODUCING THE SAME

RELATED APPLICATIONS

This application is the U.S. National Phase filing under 35 U.S.C. §371 of PCT/JP2005/023811, filed Dec. 26, 2005, which designated the United States and was published in a language other than English, which claims priority under 35 U.S.C. §119 (a)-(d) to Japanese Patent Application No. 2004-376251, filed Dec. 27, 2004; Japanese Patent Application No. 2005-039951, filed Feb. 17, 2005; Japanese Patent Application No. 2005-088781, filed Mar. 25, 2005; Japanese Patent Application No. 2005-111890, filed Apr. 8, 2005; and Japanese Patent Application No. 2005-114261, filed Apr. 12, 2005. The disclosures of all of these applications are incorporated herein by reference in their entireties.

BACKGROUND OF THE INVENTION

1. Field of the Invention

The present invention relates to a thermosensitive multiple recording sheet in which the other base material is removably attached to the side of a thermosensitive recording layer of a thermosensitive recording sheet comprising a base material and the thermosensitive recording layer formed on one surface of the base material through a temporary adhesive layer.

Also the present invention relates to a thermosensitive recording material and, particularly, to a method for producing a thermosensitive multiple recording sheet in which thermosensitive recording and thermosensitive copying are simultaneously conducted.

2. Description of Related Art

A thermosensitive recording system is used in various fields because of the following features: requiring no development; paper quality close to that of a plain paper when using a paper as a substrate; easy to handle; high color developing density; simple recording apparatus; downsizable and cheap; no noise during recording; and capable of simultaneously recording plural sheets. Particularly, the feature capable of simultaneously recording plural sheets is a feature which is excellent as compared with other recording systems such as inkjet and electrophotography, and therefore the thermosensitive recording system is widely used in the fields, such as receipts, slips and memos, where it is required to simultaneously record plural sheets. Particularly, in case of a rolled multiple sheet such as receipt used in a cash register for a supermarket, since a portable recording apparatus is required, the thermosensitive recording system is required.

A conventionally known thermosensitive multiple recording sheet is generally obtained by the following three kinds of systems.

(1) Thermally Sensitive Recording Sheet Superposition System

Thermally sensitive multiple recording sheets obtained by superposition or temporary adhesion of an upper thermosensitive recording sheet and a lower thermosensitive sheet are known (Japanese Unexamined Patent Application, First Publication No. Sho 49-73144 (Claims), Japanese Unexamined Patent Application, First Publication No. Sho 49-98640 (Claims), Japanese Unexamined Patent Application, First Publication No. Sho 49-133041 (Claims), Japanese Unexamined Patent Application, First Publication No. Sho 50-160048 (Claims) and Japanese Unexamined Patent Application, First Publication No. Sho 50-14351 (Claims)).

(2) Colored Ink Thermal Transfer Combined System

There is known a thermosensitive multiple recording sheet in which a thermosensitive color developing layer containing both components of two-component color couplers capable of reacting with heating to develop a color is formed on the surface of a substrate and a thermofusible ink containing, as main components, a thermofusible wax and a coloring material such as carbon black is coated onto the back surface of the substrate and thus the thermofusible ink can be transferred onto the lower sheet to obtain a copy (Japanese Unexamined Patent Application, First Publication No. Sho 52-115229 (Claim 1)).

(3) Reactive Thermal Transfer Combined System

There are known thermosensitive multiple recording sheets obtained by producing an upper recording sheet comprising a substrate, a thermosensitive color developing layer containing both components of two-component color couplers capable of reacting with heating to develop a color formed on the surface of the substrate, and a thermofusible transfer layer containing one component A of two-component color couplers (refereed to as A and B) as a main component coated onto the back surface of the substrate; producing a lower recording sheet comprising a substrate and a transfer receiving recording layer containing the other component B as a main component coated onto the substrate is produced; and laminating the upper recording sheet with the lower recording sheet so that the thermofusible transfer layer of the upper recording sheet and the transfer receiving recording layer of lower recording sheet face with each other (Japanese Unexamined Patent Application, First Publication No. Sho 48-47844, Japanese Unexamined Patent Application, First Publication No. Sho 50-68143, Japanese Unexamined Patent Application, First Publication No. Sho 54-1041 and Japanese Unexamined Patent Application, First Publication No. Sho 57-12693)

Like receipts, detailed payroll sheets, various notifications and medical check-up results notifications, for example, there is generally used an information recorded matter in which disclosed information capable of being confirmed by any one is recorded on the surface of a multiple sheet and confidential information is recorded inside.

In case of the multiple sheet used in the information recorded matter, it is required that disclosed information is recorded on the surface so as to improve recording efficiency and also information different from the disclosed information can be recorded inside.

In such a case, a multiple sheet of a reactive thermal transfer combined system described above and a multiple sheet of a pressure-sensitive recording system with the same constitution are mainly used at present (for example, refer to Registered Utility Model No. 3,046,499).

Since thermosensitive multiple recording sheets obtained by (2) the colored ink thermal transfer combined system and (3) the reactive thermal transfer combined system can not be laminated before recording, principally, (when laminated previously before recording, there arise a problem that the lower recording sheet is stained and the paste used for lamination inhibits transfer of the thermofusible ink or the thermofusible transfer layer of the upper recording sheet, and thus recording density is drastically decreased), it is difficult to form into a rolled sheet and therefore it is obliged to form into a strip shape by point or partial adhesion of lamination ends of two sheets, thus resulting in poor productivity and cost up. Also in case of the recording apparatus, there arose a problem that it is difficult to dispose a mounting tray of the sheet before recording and to perform continuous printing, and therefore it is obliged to use an exclusive printer.

Under these circumstances, the present inventors have taken notice of the thermosensitive multiple recording sheet obtained by (1) the thermosensitive recording sheet superposition system and studied so as to improve the thermosensitive multiple recording sheet.

SUMMARY OF THE INVENTION

An object of the present invention is to provide a thermosensitive multiple recording sheet which can simultaneously conduct thermosensitive recording of disclosed information and non-disclosed information and is also excellent in productivity and is produced at low production cost.

Although the thermosensitive multiple recording sheet obtained by the thermosensitive paper superposition system can be easily formed into a roll shape, it is required to improve image quality and recording density of the lower thermosensitive recording sheet. To solve these problems, there can be employed (A) a method of enhancing thermoresponse of the thermosensitive recording layer of the lower thermosensitive recording sheet or (B) a method of enhancing an amount of thermal transfer from the upper thermosensitive recording sheet to the lower thermosensitive recording sheet. However, these methods have the following problems.

(A) With respect to the method of enhancing recording sensitivity of the lower thermosensitive recording sheet, lowering of productivity such as decrease in drying temperature during formation of the thermosensitive layer arises and there is a limitation in view of storage stability.

(B) With respect to the method of enhancing an amount of thermal transfer from the upper thermosensitive recording sheet to the lower thermosensitive recording sheet, it is most effective to increase density and to decrease the thickness by decreasing voids in the substrate of the upper thermosensitive recording sheet.

However, when the thickness of the substrate of the upper thermosensitive recording sheet is decreased, there arises a problem with respect to processing.

(1) In a paper containing a wood pulp as a main component, there arise problems such as extension, wrinkles and paper breakage-as a result of a decrease in paper durability due to water absorption of the paper in case of coating the thermosensitive layer, resulting in poor productivity. The paper having a basis weight of 40 $g/m^2$ at most and a density of about 0.85 to 1.3 $g/cm^3$ must be used as the substrate. When the basis weight is 40 $g/m^2$ or more (density: 0.85 to 1.3 $g/cm^3$), the upper thermosensitive recording sheet has too large thickness and it is difficult to transfer enough heat to the lower thermosensitive recording sheet.

(2) In case of using a substrate made mainly of a synthetic resin, there arises a problem that the film is deformed during coating of the thermosensitive layer and it is not easy to handle the film because of poor stiffness. Therefore, the paper having a basis weight of 40 $g/m^2$ at most and a density of about 0.9 to 1.6 $g/cm^3$ must be used as the substrate. When the basis weight is 40 $g/m^2$ or more (density: 0.9 to 1.6 $g/cm^3$), the upper thermosensitive recording sheet has too large thickness and it is difficult to transfer enough heat to the lower thermosensitive recording sheet.

Thus, an object of the present invention is to provide a method for producing a thermosensitive multiple recording sheet, which causes no wrinkles in case of producing the thermosensitive multiple recording material using a thin substrate having a basis weight of 5 to 40 $g/m^2$ (a density of 0.85 to 1.3 $g/cm^3$ in case of a paper substrate, or a density of 0.9 to 1.6 $g/cm^3$ in case of a film substrate) for the upper thermosensitive recording sheet.

The present invention, which achieves the above objects, includes the following aspects.

[1] A thermosensitive multiple recording sheet characterized in that a second base material having light transmission properties is attached to the side of a first thermosensitive recording layer of a first thermosensitive recording sheet comprising a first base material and the first thermosensitive recording layer formed on one surface of the first base material, through a temporary adhesive layer, the second base material is composed of an information disclosing portion and an information non-disclosing portion, and a shielding layer is formed at the position corresponding to the information non-disclosing portion on the second base material.

[2] A thermosensitive multiple recording sheet characterized in that a second thermosensitive recording sheet comprising a second base material and a second thermosensitive recording layer formed on one surface of the second base material is attached to the side of a first thermosensitive recording layer of a first thermosensitive recording sheet comprising a first base material and the first thermosensitive recording layer formed on one surface of first the base material, through a temporary adhesive layer, the second thermosensitive recording sheet is composed of an information disclosing portion and an information non-disclosing portion, and a shielding layer is formed at the position corresponding to the information non-disclosing portion on the second thermosensitive recording sheet.

[3] The thermosensitive multiple recording sheet described in [1] or [2], wherein the temporary adhesive layer is formed by coating a coating solution containing a temporary adhesive onto the side of the first thermosensitive recording layer or the side of the second base material, and laminating the first thermosensitive recording layer and the second base material, followed by drying.

[4] The thermosensitive multiple recording sheet described in any one of [1] to [3], wherein an adhesive strength between the first thermosensitive recording sheet and the second base material in the temporary adhesive layer is from 50 to 1000 mN/25 mm (peeling rate: 300 mm/min.) as measured according to a T-type peeling test defined in JIS K 6854-3.

[5] The thermosensitive multiple recording sheet described in any one of [1] to [4], wherein the shielding layer is formed by printing.

[6] The thermosensitive multiple recording sheet described in any one of [1] to [4], wherein the shielding layer is formed by an inkjet recording apparatus or a thermal transfer recording apparatus.

[7] The thermosensitive multiple recording sheet described in any one of [1] to [6], wherein an ultraviolet curable resin layer is formed on the entire surface on which the thermosensitive recording layer of the first thermosensitive recording sheet comprising the first base material and the first thermosensitive recording layer formed on one surface of the first base material is not formed, or the entire surface including the shielding layer of the second base material.

[8] The thermosensitive multiple recording sheet described in any one of [1] to [7], wherein the second base material is cut or cuttable.

[9] A method for producing a thermosensitive multiple recording sheet by laying at least two thermosensitive recording sheets one upon another, the method comprising the first step of attaching a second base material onto the side of a recording layer of a first thermosensitive recording sheet through a temporary adhesive layer to obtain a laminated sheet comprising the first thermosensitive recording sheet, the temporary adhesive layer and the second base material, and the second step of forming a thermosensitive recording layer on the surface of the second base material in the laminated sheet obtained by the first step.

[10] A method for producing a thermosensitive recorded matter, which comprises the steps of:

subjecting a thermosensitive multiple recording sheet comprising a first thermosensitive recording sheet comprising a first base material and a first thermosensitive recording layer formed on the first base material and a second thermosensitive recording sheet comprising a second thermosensitive recording sheet comprising a second base material and a second thermosensitive recording layer formed on the second base material, the second thermosensitive recording sheet being laminated onto the side of the first thermosensitive recording layer through a temporary adhesive layer, to thermosensitive recording through thermal energy T1, which enables the second thermosensitive recording layer to develop a color and also enables the first thermosensitive recording layer to develop no color, from the second thermosensitive recording layer of the thermosensitive multiple recording sheet, thereby to record a recording A on the second thermosensitive recording layer, and subjecting the thermosensitive multiple recording sheet to thermosensitive recording through thermal energy T2, which enables the first thermosensitive recording layer to develop a color, from the side of the second thermosensitive recording layer of the thermosensitive multiple recording sheet, thereby to record a recording B, which is different from the recording A, on the first thermosensitive recording layer.

[11] The method for producing a thermosensitive recorded matter described in [10], comprising the step of forming a blindfolding printing portion on the second thermosensitive recording layer by subjecting the thermosensitive recording multiple sheet to thermosensitive recording through thermal energy T1.

[12] A method for producing an information recorded matter in which a second sheet is attached onto an information recording layer of a first sheet comprising a first base material and an information recording layer including information recorded thereon formed on one surface of the first base material, the method comprising the steps of:

coating a solution containing a temporary adhesive onto the information recording layer of the first sheet or the second sheet to form a coated layer, laminating the first sheet with the second sheet through the coated layer while the coated layer is in a wet state, and drying the coated layer to form a temporary adhesive layer.

According to the present invention, there can be provided a thermosensitive multiple recording sheet which can simultaneously conduct thermosensitive recording of disclosed information and non-disclosed information and is also excellent in productivity and is produced at low production cost.

In the thermosensitive multiple recording sheet of the present invention, disclosed information recorded on the first thermosensitive recording layer is displayed at the information disclosing portion and non-disclosed information recorded on the first thermosensitive recording layer is not visible from the outside due to the shielding layer. Therefore, it is possible to simultaneously performing thermosensitive recording of disclosed information and non-disclosed information to the thermosensitive multiple recording sheet of the present invention.

The thermosensitive multiple recording sheet of the present invention can be easily formed into a roll shape by laminating the second base material onto the first thermosensitive recording layer through the temporary adhesive layer, and is also excellent in productivity. Since the thermosensitive multiple recording sheet can be formed into a roll shape, it is easy to dispose a mounting tray of the thermosensitive multiple recording sheet before recording and to perform continuous printing in a recording apparatus used for recording onto the thermosensitive multiple recording sheet.

Furthermore, the thermosensitive multiple recording sheet of the present invention is excellent in security to confidential information. That is, since the second base material is laminated onto the first thermosensitive recording layer through the temporary adhesive layer, the second base material once removed is not reattached with ease, and thus it is found whether or not someone else looked at confidential information such as secret identification number or password after removing the non-disclosing portion of the second base material before the person himself confirms the confidential information.

By using the production method of the present invention, there can be obtained a thermosensitive multiple recording material without causing wrinkles in case of producing using a second base material having a basis weight of 5 to 40 $g/m^2$ (a density of 0.85 to 1.3 $g/cm^3$ in case of a paper base material, or a density of 0.9 to 1.6 $g/cm^3$ in case of a film substrate).

BRIEF DESCRIPTION OF THE REFERENCE SYMBOLS

Figure 1:
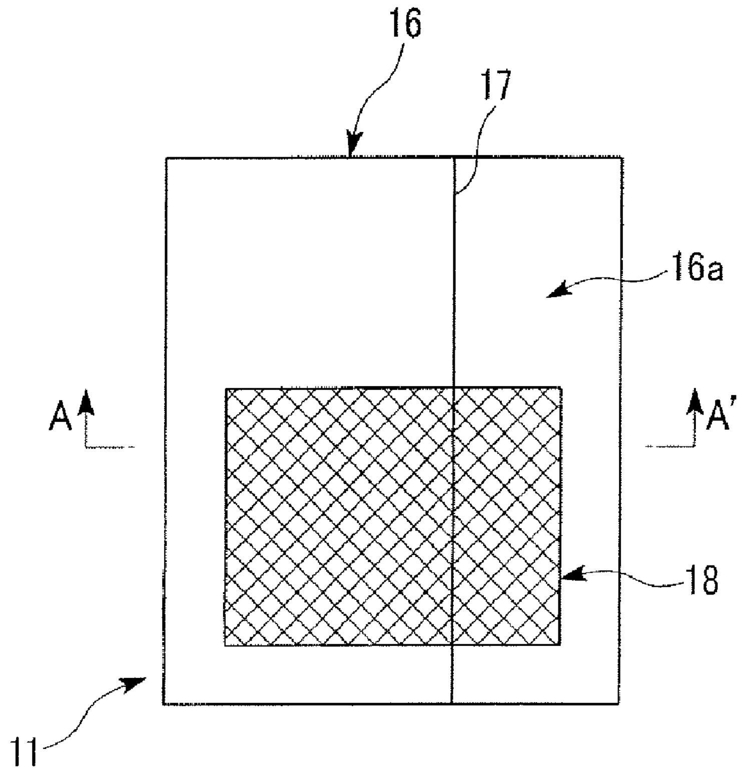
FIG. 1 is a top view showing the first embodiment of a thermosensitive multiple recording sheet according to the present invention.

11: Thermally sensitive multiple recording sheet
12: First base material
13: First thermosensitive recording layer
14: First thermosensitive recording sheet
15: Temporary adhesive layer
15*a:* Temporary adhesive layer
16: Second base material
16*a:* Information disclosing portion
16*b:* Information non-disclosing portion
17: Half-cut processing
18: Shielding layer
19: Shielding layer
21: Thermally sensitive multiple recording sheet
22: First base material
23: First thermosensitive recording layer
24: First thermosensitive recording sheet
25: Temporary adhesive layer
25*a:* Temporary adhesive layer
26: Second base material
27: Second thermosensitive recording layer
28: Second thermosensitive recording sheet
28*a:* Information disclosing portion
28*b:* Information non-disclosing portion
29: Half-cut processing
30: Shielding layer
31: Shielding layer
32: Ultraviolet curable resin layer
33: Ultraviolet curable resin layer
34: Ultraviolet curable resin layer
35: Ultraviolet curable resin layer
110: Information recorded matter
111: First substrate
112: Information recording layer
113: First sheet
114: Temporary adhesive layer
115: Second sheet
120: Apparatus
121: Feeding section
122: Feeding section
123: Coating section
124: Lamination section
125: Drying section
126: Taking up section

DETAILED DESCRIPTION OF THE INVENTION

<<First Embodiment>>

Figure 2:
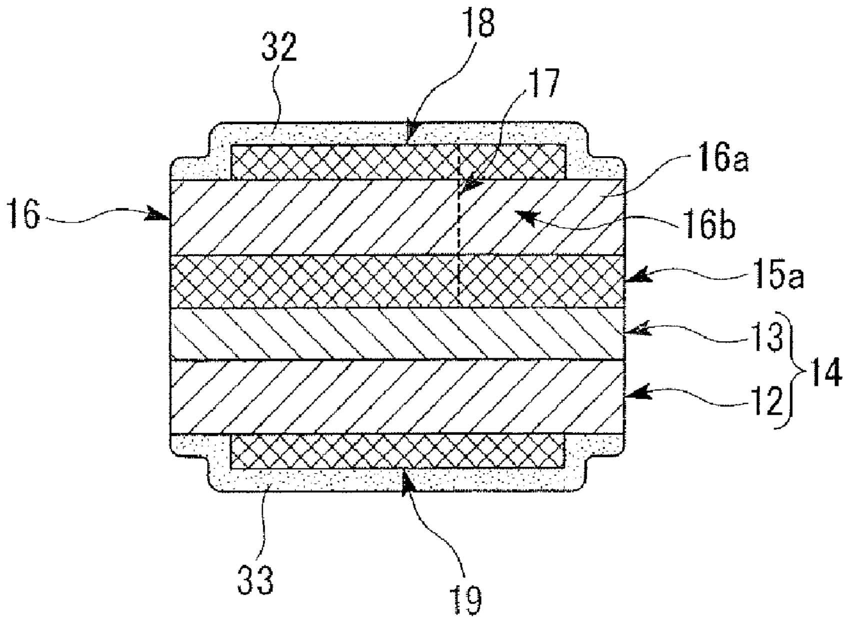
FIG. 2 is a longitudinal sectional view taken along lines A-A' of the thermosensitive multiple recording sheet shown in FIG. 1.
Figure 5:
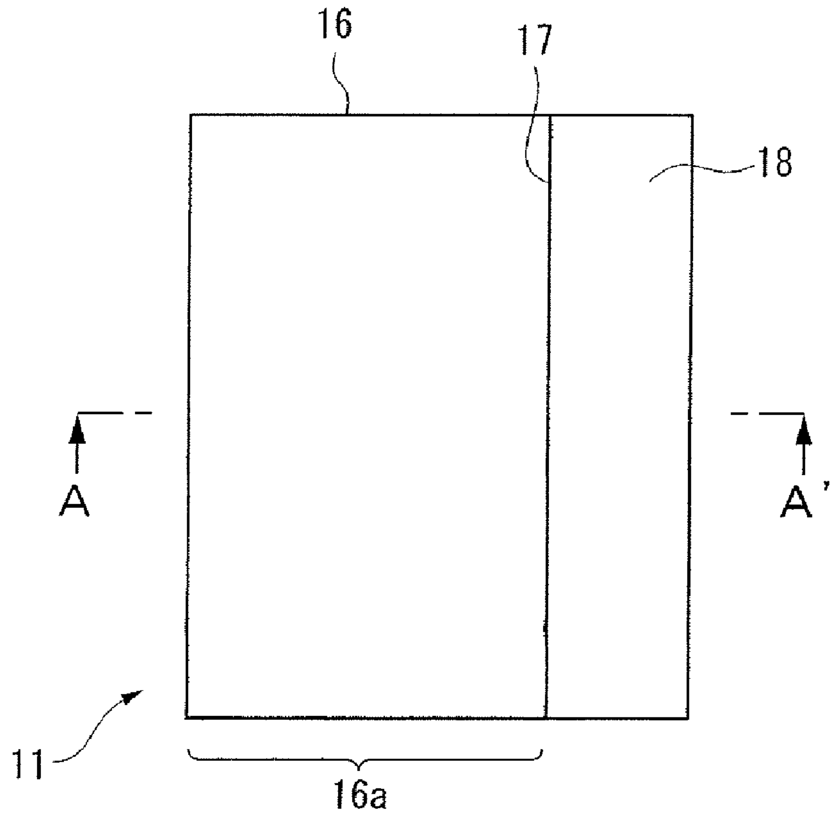
FIG. 5 is a top view showing the first embodiment of a thermosensitive multiple recording sheet according to the present invention.
Figure 6:
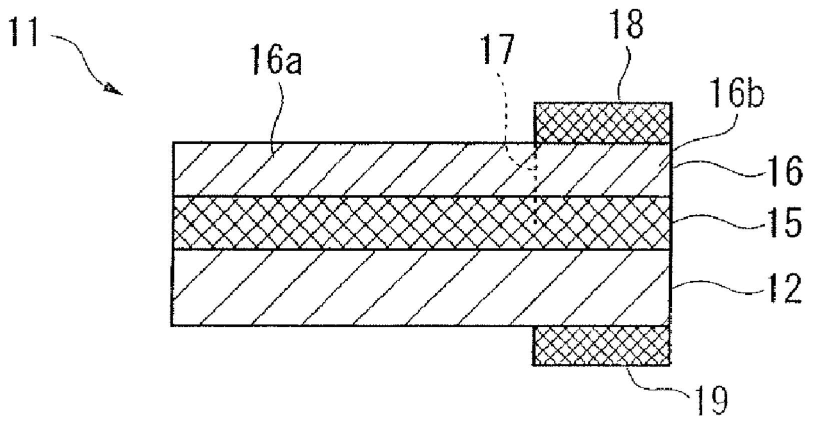
FIG. 6 is a longitudinal sectional view taken along lines A-A' of the thermosensitive multiple recording sheet shown in FIG. 5.

In FIGS. 1 to 2 and 5 to 6, the first embodiment of the thermosensitive multiple recording sheet according to the present invention is shown. FIGS. 1 and 5 are top views showing a thermosensitive multiple recording sheet 11 of the present embodiment, and FIGS. 2 and 6 are longitudinal sectional views taken along lines A-A' in FIGS. 1 and 5.

The thermosensitive multiple recording sheet 11 is obtained by attaching a second base material 16 having light transmission properties onto a first thermosensitive recording layer 13 of a first thermosensitive recording sheet 14 comprising a first base material 12 and the first thermosensitive recording layer 13 formed on one surface of the first base material, through a temporary adhesive layer 15*a*.

The second base material 16 is composed of an information disclosing portion 16*a* and an information non-disclosing portion 16*b*.

At the position corresponding to the information non-disclosing portion 16*b* on the second base material 16 a shielding layer 18 is formed. At the position corresponding to the information non-disclosing portion 16*b* on the first base material 12, a second shielding layer 19 is formed.

An ultraviolet curable resin layer 32 is formed so as to cover the back surface of the second base material 16 and the second shielding layer 18.

An ultraviolet curable resin layer 33 is formed so as to cover the surface of the first base material 12 and the first shielding layer 19.

Although the ultraviolet curable resin layers 32, 33 are not essential, water resistance and scratch resistance are enhanced by forming these layers and performances close to those of a plastic card are attained, and thus it is preferable.

The second base material 16 is cut by a half-cut processing 17.

Although the half-cut processing 17 is not essential, it becomes easy to remove the first thermosensitive recording sheet 14 from the second base material 16, and thus it is preferable.

Each constitution of the thermosensitive multiple recording sheet 11 of the present embodiment will now be described in detail at any position.

<First Base Material 12>

The first base material 12 is not specifically limited and a paper and various synthetic resins are appropriately used, if necessary. The base material is preferably a base material having air permeability, and more preferably a paper.

The thickness of the first base material 12 is not specifically limited, but is preferably from 40 to 100 μm in view of adhesive aptitude and handling properties.

<First Thermosensitive Recording Layer 13>

The first thermosensitive recording layer 13 is a layer containing a reactive dye (dye precursor) and a developer. In such a layer, the reactive dye reacts with the developer by heating to develop a color.

The first thermosensitive recording layer 13 may be a single layer containing a reactive dye and a developer, or a multilayer comprising at least two layers of a layer containing a reactive dye and containing no developer and a layer containing a developer and containing no reactive dye. The first thermosensitive recording layer is preferably a single layer because it is excellent in reactivity and thermoresponse.

Various known reactive dyes and developers can be used and examples of specific combination of the reactive dye and the developer include a leuco compound (leuco dye) and an electron-accepting substance, an imino compound and an isocyanate compound, and a long chain fatty acid iron salt and a polyhydric phenol. Among these combinations, the combination of the leuco compound and the electron-accepting substance is preferable because of excellent thermoresponse, high color developing density and comparative stability. The combination of the imino compound and the isocyanate compound is preferable because an adverse influence of a surfactant is hardly exerted on color development and storage stability is excellent.

Specific examples of the reactive dye and the developer are shown below.

Examples of the leuco compound include triphenylmethane-based compounds, fluoran-based compounds, phenothiazine-based compounds, auramine-based compounds, spiropyran-based compounds and indolinophthalide-based compounds. Specific examples thereof include 3,3-bis(p-dimethylaminophenyl)-phthalide, 3,3-bis(p-dimethylaminophenyl)-6-dimethylaminophthalide, 3,3-bis(p-dimethylaminophenyl)-6-diethylaminophthalide, 3,3-bis(p-dimethylaminophenyl)-6-chlorophthalide, 3,3-bis(p-dibutylaminophenyl)phthalide, 3-cyclohexylamino-6-chlorofluoran, 3-dimethylamino-5,7-dimethylfluoran, 3-N-methyl-N-isobutyl-6-methyl-7-anilinofluoran, 3-N-ethyl-N-isoamyl-6-methyl-7-anilinofluoran, 3-diethylamino-7-chlorofluoran, 3-diethylamino-7-methylfluoran, 3-diethylamino-7,8-benzfluoran, 3-diethylamino-6-methyl-7-chlorofluoran, 3-(N-ethyl-N-p-tolyl)-6-methyl-7-anilinofluoran, 3-(N-p-tolyl-N-ethylamino)-6-methyl-7-anilinofluoran, 3-pyrrolidino-6-methyl-7-anilinofluoran, 2-{N-3'-trifluoromethylphenyl)amino}-6-diethylaminofluoran, 2-{3,6-bis(diethylamino)-9-(o-chloroanilino)xanthylbenzoic acid lactam}, 3-diethylamino-6-methyl-7-(m-trichloromethylanilino)fluoran, 3-diethylamino-7-(o-chloroanilino)fluoran, 3-dibutylamino-7-(o-chloroanilino)fluoran, 3-N-methyl-N-amylamino-6-methyl-7-anilinofluoran, 3-N-methyl-N-cyclohexylamino-6-methyl-7-anilinofluoran, 3-diethylamino-6-methyl-7-anilinofluoran, 3-diethylamino-6-methyl-7-(2',4'-dimethylanilino)fluoran, 3-(N,N-diethylamino)-5-methyl-7-(N,N-dibenzylamino)fluoran, benzoylleucomethylene blue, 6'-chloro-8'-methoxybenzoindolino-spiropyran, 6'-bromo-3'-methoxybenzoindolino-spiropyran, 3-(2'-hydroxy-4'-dimethylaminophenyl)-3-(2-methoxy-5'-chlorophenyl)phthalide, 3-(2'-hydroxy-4'-dimethylaminophenyl)-3-(2'-methoxy-5'-nitrophenyl)phthalide, 3-(2'-hydroxy-4'-diethylaminophenyl)-3-(2'-methoxy-5'-methylphenyl) phthalide, 3-(2'-methoxy-4'-dimethylaminophenyl)-3-(2'-hydroxy-4'-chloro-5'-methylphenyl)phthalide, 3-morpholino-7-(N-propyltrifluoromethylanilino)fluoran, 3-pyrrolidino-7-trifluoromethylanilinofluoran, 3-diethylamino-5-chloro-7-(N-benzyltrifluoromethylanilino)fluoran, 3-pyrrolidino-7-(di-p-chlorophenyl)methylaminofluoran, 3-diethylamino-5-chloro-7-(α-phenylethylamino)fluoran, 3-(N-ethyl-p-toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyltoluidino)-7-(p-n-butylanilino)fluoran, 3-(N-methyl-N-isopropylamino)-6-methyl-7-anilinofluoran, 3-dibutylamino-6-methyl-7-anilinofluoran, 3,6-bis(dimethylamino)fluorenespiro(9,3')-6'-dimethylaminophthalide, 3-(N-benzyl-N-cyclohexylamino)-5,6-benzo-7-α-naphthylamino-4'-bromofluoran, 3-diethylamino-6-chloro-7-anilinofluoran, 3-N-ethyl-N-(2-ethoxypropyl)amino-6-methyl-7-anilinofluoran, 3-N-ethyl-N-tetrahydrofurfurylamino-6-methyl-7-anilinofluoran and 3-diethylamino-6-methyl-7-mesitydino-4',5'-benzofluoran. These leuco compounds may be used alone or in combination.

The electron-accepting substance, which is brought into contact with the leuco compound, thereby allowing it to develop a color, is not specifically limited and examples thereof include phenolic compounds, thiophenolic compounds, thiourea derivatives, organic acids and metal salts thereof. Specific examples thereof include phenolic compounds such as 4-tert-butylphenol, 4-acetylphenol, 4-tert-octylphenol, 4,4'-sec-butylidenediphenol, 4-phenylphenol, 4,4'-dihydroxydiphenylmethane, 4,4'-isopropylidenediphenol, 4,4'-cyclohexylidenediphenol, 1,1-bis(4-hydroxyphenyl)-1-phenylethane, 4,4'-dihydroxydiphenyl sulfide, 4,4'-thiobis(3-methyl-6-tert-butylphenol), 4,4'-dihydroxydiphenylsulfone, 2,4'-dihydroxydiphenylsulfone, 4-hydroxy-4'-isopropoxydiphenylsulfone, bis(3-allyl-4-hydroxyphenyl)sulfone, butyl bis(p-hydroxyphenyl)acetate and methyl bis(p-hydroxyphenyl)acetate; phenolic compounds such as 4-hydroxybenzophenone, dimethyl 4-hydroxyphthalate, methyl 4-hydroxybenzoate, propyl 4-hydroxybenzoate, sec-butyl 4-hydroxybenzoate, phenyl 4-hydroxybenzoate, benzyl 4-hydroxybenzoate, tolyl 4-hydroxybenzoate, chlorophenyl 4-hydroxybenzoate and 4,4'-dihydroxydiphenyl ether; aromatic carboxylic acids such as benzoic acid, p-tert-butylbenzoic acid, trichlorobenzoic acid, terephthalic acid, salicylic acid, 3-tert-butylsalicylic acid, 3-isopropylsalicylic acid, 3-benzylsalicylic acid, 3-(α-methylbenzyl)salicylic acid and 3,5-di-tert-butylsalicylic acid; organic acidic substances such as salts of these phenolic compounds or aromatic carboxylic acids and polyvalent metals such as zinc, magnesium, aluminum and calcium; and urea compounds such as N-p-toluenesulfonyl N'-3-(p-toluenesulfonyloxy)phenyl urea, N-(p-toluenesulfonyl)-N'-(p-butoxycarboyl)urea and N-p-tolylsulfonyl N'-phenyl urea. These electron-accepting substances may be used alone or in combination.

The imino compound is a compound having at least one imino group (=NH) and examples thereof include a colorless or pale colored compound, which is solid at normal temperature, represented by the following general formula:

[Chemical Formula 1]

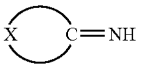

wherein X represents an aromatic compound residue capable of forming a conjugated system with adjacent C=N.

Specific examples of the imino compound include 3-iminoisoindolin-1-one, 3-imino-4,5,6,7-tetrachloroisoindolin-1-one, 3-imino-4,5,6,7-tetrabromoisoindolin-1-one, 3-imino-4,5,6,7-tetrafluoroisoindolin-1-one, 3-imino-5,6-dichloroisoindolin-1-one, 3-imino-4,5,7-trichloro-6-methoxy-isoindolin-1-one, 3-imino-4,5,7-trichloro-6-methylmercaptoisoindolin-1-one, 3-imino6-nitroisoindolin-1-one, 3-iminoisoindoline-1-spiro-dioxolane, 1,1-dimethoxy-3-iminoisoindoline, 1,1-diethoxy-3-imino-4,5,6,7-tetrachloroisoindoline, 1-ethoxy-3-iminoisoindoline, 1,3-diiminoisoindoline, 1,3-diimino-4,5,6,7-tetrachloroisoindoline, 1,3-diimino-6-methoxyisoindoline, 1,3-diimino-6-cyanoisoindoline, 1,3-diimino-4,7-dithia-5,5,6,6-tetrahydroisoindoline, 7-amino-2,3-dimethyl-5-oxopyrrolo[3,4b] pyrazine, 7-amino-2,3-diphenyl-5-oxopyrrolo[3,4b] pyrazine, 1-iminonaphthalic acid imide, 1-iminodiphenic acid imide, 1-phenylimino-3-iminoisoindoline, 1-(3'-chlorophenylimino)-3-iminoisoindoline, 1-(2',5'-dichlorophenylimino)-3-iminoisoindoline, 1-(2',4',5'-trichlorophenylimino)-3-iminoisoindoline, 1-(2'-cyano-4'-nitrophenylimino)-3-iminoisoindoline, 1-(2'-chloro-5'-cyanophenylimino)-3-iminoisoindoline, 1-(2',6'-dichloro-4'-nitrophenylimino)-3-iminoisoindoline, 1-(2',5'-dimethoxyphenylimino)-3-iminoisoindoline, 1-(2',5'-diethoxyphenylimino)-3-iminoisoindoline, 1-(2'-methyl-4'-nitrophenylimino)-3-iminoisoindoline, 1-(5'-chloro-2'-phenoxyphenylimino)-3-iminoisoindoline, 1-(4'-N,N-dimethylaminophenylimino)-3-iminoisoindoline, 1-(3'-N,N-dimethylamino-4'-methoxyphenylimino)-3-iminoisoindoline, 1-(2'-methoxy-5'-N-phenylcarbamoylphenylimino)-3-iminoisoindoline, 1-(2'-chloro-5'-trifluoromethylphenylimino)-3-iminoisoindoline, 1-(5',6'-dichlorobenzothiazolyl-2'-imino)-3-iminoisoindoline, 1-(6'-methylbenzothiazolyl-2'-imino)-3-iminoisoindoline, 1-(4'-phenylaminophenylimino)-3-iminoisoindoline, 1-(p-phenylazophenylimino)-3-iminoisoindoline, 1-(naphthyl-1'-imino)-3-iminoisoindoline, 1-(anthraquinone-1'-imino)-3-iminoisoindoline, 1-(5'-chloroanthraquinone-1'-imino)-3-iminoisoindoline, 1-(N-ethylcarbazolyl-3'-imino)-3-iminoisoindoline, 1-(naphthoquinone-1'-imino)-3-iminoisoindoline, 1-(pyridyl-4'-imino)-3-iminoisoindoline, 1-(benzimidazolone-6'-imino)-3-iminoisoindoline, 1-(1'-methylbenzimidazolone-6'-imino)-3-iminoisoindoline, 1-(7'-chlorobenzimidazolone-5'-imino)-3-iminoisoindoline, 1-(benzimidazolyl-2'-imino)-3-iminoisoindoline, 1-(benzimidazolyl-2'-imino)-3-imino-4,5,6,7-tetrachloroisoindoline, 1-(2',4'-dinitrophenylhydrazone)-3-iminoisoindoline, 1-(indazolyl-3'-imino)-3-iminoisoindoline, 1-(indazolyl-3'-imino)-3-imino-4,5,6,7-tetrabromoisoindoline, 1-(indazolyl-3'-imino)-3-imino-4,5,6,7-tetrafluoroisoindoline, 1-(benzimidazolyl-2'-imino)-3-imino-4,7-dithiatetrahydroisoindoline, 1-(4',5'-dicyanoimidazolyl-2'-imino)-3-imino-5,6-dimethyl-4,7-pyradiisoindoline, 1-(cyanobenzoylmethylene)-3-iminoisoindoline, 1-(cyanocarbonamidemethylene)-3-iminoisoindoline, 1-(cyanocarbomethoxymethylene)-3-iminoisoindoline, 1-(cyanocarboethoxymethylene)-3-iminoisoindoline, 1-(cyano-N-phenylcarbamoylmethylene)-3-iminoisoindoline, 1-[cyano-N-(3'-methylphenyl)-carbamoylmethylene]-3-iminoisoindoline, 1-[cyano-N-(4'-chlorophenyl)-carbamoylmethylene]-3-iminoisoindoline, 1-[cyano-N-(4'-methoxyphenyl)-carbamoylmethylene]-3-iminoisoindoline, 1-[cyano-N-(3'-chloro-4'-methylphenyl)-carbamoylmethylene]-3-iminoisoindoline, 1-(cyano-p-nitrophenylmethylene)-3-iminoisoindoline, 1-(dicyanomethylene)-3-iminoisoindoline, 1-[cyano-1',2',4'-triazolyl-(3')-carbamoylmethylene]-3-iminoisoindoline, 1-[cyanothiazoyl-(2')-carbamoylmethylene]-3-iminoisoindoline, 1-[cyanobenzimidazolyl-(2')-carbamoylmethylene]-3-iminoisoindoline, 1-[cyanobenzothiazolyl-(2')-carbamoylmethylene]-3-iminoisoindoline, 1-[cyanobenzimidazolyl-(2')-methylene]-3-iminoisoindoline, 1-[cyanobenzimidazolyl-(2')-methylene]-3-imino-4,5,6,7-tetrachloroisoindoline, 1-[(cyanobenzimidazolyl-2')-methylene]-3-imino-5-methoxyisoindoline, 1-[(cyanobenzimidazolyl-2')-methylene]-3-imino-6-chloroisoindoline, 1-[(1'-phenyl-3'-methyl-5-oxo)-pyrazolidene-4']-3-iminoisoindoline, 1-[(cyanobenzimidazolyl-2')-methylene]-3-imino-4,7-dithiatetrahydroisoindoline, 1-[(cyanobenzimidazolyl-2')-methylene]-3-imino-5,6-dimethyl-4,7-pyradiisoindoline, 1-[(1'-methyl-3'-n-butyl)-barbituric acid-5']-3-iminoisoindoline, 3-imino-1-sulfobenzoic acid imide, 3-imino-1-sulfo-6-chlorobenzoic acid imide, 3-imino-1-sulfo-5,6-dichlorobenzoic acid imide, 3-imino-1-sulfo-4,5,6,7-tetrachlorobenzoic acid imide, 3-imino-1-sulfo-4,5,6,7-tetrabromobenzoic acid imide, 3-imino-1-sulfo-4,5,6,7-tetrafluorobenzoic acid imide, 3-imino-1-sulfo-6-nitrobenzoic acid imide, 3-imino-1-sulfo-6-methoxybenzoic acid imide, 3-imino-1-sulfo-4,5,7-trichloro-6-methylmercaptobenzoic acid imide, 3-imino-1-sulfonaphthoic acid imide, 3-imino-1-sulfo-5-bromonaphthoic acid imide and 3-imino-2-methyl-4,5,6,7-tetrachloroisoindolin-1-one.

Examples of the isocyanate compound, which is brought into contact with the imino compound, thereby allowing it to develop a color, include a colorless or pale colored aromatic isocyanate or heterocyclic isocyanate compound, which is solid at normal temperature. Specific examples thereof include 2,6-dichlorophenyl isocyanate, p-chlorophenyl isocyanate, 1,3-phenylene diisocyanate, 1,4-phenylene diisocyanate, 1,3-dimethylbenzene-4,6-diisocyanate, 1,4-dimethylbenzene-2,5-diisocyanate, 1-methoxybenzene-2,4-diisocyanate, 1-methoxybenzene-2,5-diisocyanate, 1-ethoxybenzene2,4-diisocyanate, 2,5-dimethoxybenzene-1,4-diisocyanate, 2,5-diethoxybenzene-1,4-diisocyanate, 2,5-dibutoxybenzene-1,4-diisocyanate, azobenzene-4,4'-diisocyanate, diphenylether-4,4'-diisocyanate, naphthalene-1,4-diisocyanate, naphthalene-1,5-diisocyanate, naphthalene-2,6-diisocyanate, naphthalene-2,7-diisocyanate, 3,3'-dimethylbiphenyl-4,4'-diisocyanate, 3,3'-dimethoxybiphenyl-4,4'-diisocyanate, diphenylmethane-4,4'-diisocyanate, diphenyldimethylmethane-4,4'-diisocyanate, benzophenone-3,3'-diisocyanate, fluorene-2,7-diisocyanate, anthraquinone-2,6-diisocyanate, 9-ethylcarbazole-3,6-diisocyanate, pyrene-3,8-diisocyanate, naphthalene-1,3,7-triisocyanate, biphenyl-2,4,4'-triisocyanate, 4,4',4"-triisocyanate-2,5-dimethoxytriphenylamine, 4,4',4"-triisocyanatetriphenylamine, p-dimethylaminophenyl isocyanate and tris(4-phenylisocyanate)thiophosphate. If necessary, these isocyanate compounds may be used in the form of a so-called block isocyanate which is an addition compound with phenols, lactams and oximes, and may be in the form of an isocyanurate which is a dimer of a diisocyanate, for example, a dimer and a trimer of 1-methylbenzene-2,4-diisocyanate, and also may be used in the form of a polyisocyanate adducted with various polyols.

In the first thermosensitive recording layer 13, the amount of the reactive dye is preferably from 10 to 50% by mass, and more preferably from 10 to 20% by mass, based on the entire solid content of the thermosensitive recording layer 13 taking account of color developing properties.

In the first thermosensitive recording layer 13, the amount of the developer is preferably from 100 to 700 parts by mass, and more preferably from 150 to 400 parts by mass, based on 100 parts by mass of the sum of the reactive dye.

The first thermosensitive recording layer 13 contains an adhesive, in addition to the reactive dye and the developer.

Examples of the adhesive include polyvinyl alcohol and derivatives thereof; starch and derivatives thereof; cellulose derivatives such as hydroxymethyl cellulose, hydroxyethyl cellulose, hydroxypropyl cellulose, methyl cellulose and ethyl cellulose; water-soluble polymer materials such as sodium polyacrylate, polyvinyl pyrrolidone, acrylamide-acrylate ester copolymer, acrylamide-acrylate ester-methacrylate ester copolymer, styrene-maleic anhydride copolymer, isobutylene-maleic anhydride copolymer, casein, gelatin and derivatives thereof; emulsions of polyvinyl acetate, polyurethane, polyacrylic acid, polyacrylate ester, vinyl chloride-vinyl acetate copolymer, polybutyl methacrylate and ethylene-vinyl acetate copolymer; and latexes of water-insoluble polymers such as styrene-butadiene copolymer and styrene-butadiene-acryl copolymer.

In the first thermosensitive recording layer 13, the amount of the adhesive is preferably from 5 to 40% by mass, and more preferably from 10 to 30% by mass, based on the entire solid content of the first thermosensitive recording layer 13.

It is preferred that the first thermosensitive recording layer 13 further contains a sensitizer so as to control color developing sensitivity. As the sensitizer, there can be used compounds which have conventionally been known as the sensitizer of the thermosensitive recording material and examples thereof include an organic substance (hereinafter referred to as a thermofusible substance) which has comparatively low melting point and is excellent in compatibility with the reactive dye and the developer. The thermofusible substance is compatible with the reactive dye and the developer, thereby to enhance probability of contact between both components and to exert a sensitization action. Examples of the thermofusible substance include parabenzylbiphenyl, dibenzyl terephthalate, phenyl 1-hydroxy-2-naphthoate, dibenzyl oxalate, di-o-chlorobenzyl adipate, 1,2-di(3-methylphenoxy)ethane, di-p-methylbenzyl oxalate, di-p-chlorobenzyl oxalate, 1,2-bis(3,4-dimethylphenyl)ethane and 1,3-bis(2-naphthoxy)propane.

In the first thermosensitive recording layer 13, the amount of the thermofusible substance is preferably from 25 to 500 parts by mass, and more preferably from 100 to 300 parts by mass, based on 100 parts by mass of the sum of the reactive dye.

The first thermosensitive recording layer 13 may further contain an image stabilizer for main purpose of improving storage life of thermosensitive recording images. As the image stabilizer, for example, there can be used those containing one or more kinds selected from phenolic compounds such as 1,1,3-tris(2-methyl-4-hydroxy-5-cyclohexylphenyl) butane, 1,1,3-tris(2-methyl-4-hydroxy-5-tert-butylphenyl) butane, 1,1-bis(2-methyl-4-hydroxy-5-tert-butylphenyl)butane, 4,4'-[1,4-phenylenebis(1-methylethylidene)]bisphenol and 4,4'-[1,3-phenylenebis(1-methylethylidene)]bisphenol; epoxy compounds such as 4-benzyloxyphenyl-4'-(2-methyl-2,3-epoxypropyloxy)phenylsulfone, 4-(2-methyl-1,2-epoxyethyl)diphenylsulfone and 4-(2-ethyl-1,2-epoxyethyl)diphenylsulfone; and isocyanuric acid compounds such as 1,3,5-tris(2,6-dimethylbenzyl-3-hydroxy-4-tert-butyl)isocyanuric acid. As a matter of course, image stabilizers are not limited to these compounds and two or more compounds can be used in combination.

In the first thermosensitive recording layer 13, the amount of the image stabilizer is preferably from 5 to 100 parts by mass, and more preferably from 10 to 60 parts by mass, based on 100 parts by mass of the sum of the reactive dye.

The first thermosensitive recording layer 13 can contain a crosslinking agent for three-dimensional curing of the above-described adhesives so as to improve water resistance.

Examples of the crosslinking agent include aldehyde-based compounds such as glyoxazole; polyamine-based compounds such as polyethyleneimine; epoxy-based compounds; polyamide resins; melamine resins; dimethylol urea compounds; aziridine compounds; block isocyanate compounds; inorganic compounds such as ammonium persulfate; ferric chloride, magnesium chloride, sodium tetraborate and potassium tetraborate; boric acid, boric acid triester and boron-based polymers.

In the first thermosensitive recording layer 13, the amount of the crosslinking agent is preferably within a range from 1 to 10% by mass based on the entire solid content of the thermosensitive recording layer 13.

The first thermosensitive recording layer 13 may also contain a pigment. Examples of the pigment include inorganic pigments such as calcium carbonate, magnesium carbonate, kaolin, clay, talc, calcined clay, silica, diatomaceous earth, synthetic aluminum silicate, zinc oxide, titanium oxide, aluminum hydroxide, barium sulfate, surface-treated calcium carbonate and silica; and organic pigments such as urea-formalin resin, styrene-methacrylic acid copolymer resin and polystyrene resin.

In the first thermosensitive recording layer 13, the amount of the pigment is preferably the amount which does not decrease color developing density, and is preferably 50% by mass or less based on the entire solid content of the thermosensitive recording layer 13.

The amount of the pigment is preferably from 1 to 100 parts by mass, and more preferably from 5 to 50 parts by mass, based on 100 parts by mass of the reactive dye.

If necessary, the first thermosensitive recording layer 13 may further contain various additives used usually in the thermosensitive recording material. Examples of the additive include waxes, metal soap, colored dye, fluorescent dye, oil repellent, defoamer and viscosity modifier.

Examples of waxes include waxes such as paraffin wax, carnauba wax, microcrystalline wax, and polyolefin wax such as polyethylene wax; higher fatty acid amides such as stearic acid amide and ethylenebisstearic acid amide; and higher fatty acid esters and derivatives thereof. When methylolated fatty acid amide is added to the thermosensitive recording layer, the sensitizing effect can be exerted without adversely affecting surface fogging resistance.

Examples of the metal soap include higher fatty acid polyhydric metal salts such as zinc stearate, aluminum stearate, calcium stearate and zinc oleate.

The thermosensitive recording layer 13 can be formed, for example, by dispersing a reactive dye, a developer and an adhesive as well as optional components in a dispersion medium such as water to prepare a coating solution and coating the coating solution onto one surface of the first base material 12, followed by drying.

At this time, when the reactive dye and the developer are separately dispersed in the dispersion medium to form a thermosensitive recording layer, the resulting dispersions are preferably mixed.

The dispersion can be prepared by using an agitating and grinding apparatus such as ball mill, atriter or sand mill.

Examples of the method of coating the coating solution include air knife coating, barrier blade coating, pure blade coating, rod blade coating, short dowel coating, curtain coating, die coating and gravure coating method.

The thermosensitive recording layer 13 may be subjecting to a smoothing treatment using a known smoothing method such as super calendaring or soft calendaring. Consequently, color developing sensitivity can be enhanced. The smoothing treatment may be conducted while bringing the surface of the thermosensitive recording layer 13 into contact with any of a metal roll and elastic roll of a calendar.

The coating weight of the thermosensitive recording layer 13 is preferably from 1 to 10 g/$m^2$, and more preferably from 2 to 5 g/$m^2$, taking account of color developing properties.

<Temporary Adhesive Layer **15*a***>

The temporary adhesive layer **15*a*** is not specifically limited as far as it has a property which is removable again and is not reattachable, and may be a layer composed of a temporary adhesive used usually for temporary adhesion and an adhesive force modifier contained optionally.

The temporary adhesive constituting the temporary adhesive layer **15*a*** is not specifically limited and there can be used usually for temporary adhesion, for example, rubber-based adhesives such as natural rubber and synthetic rubber; acrylic adhesives containing acrylic acid and/or acrylate ester as a monomer component; vinyl acetate-based adhesive containing vinyl acetate as a main monomer component, such as vinyl acetate polymer and ethylene-vinyl acetate copolymer (EVA); polysaccharide-based adhesives such as starch and sodium alginate and water-soluble adhesives such as dextrin-based adhesive.

In the present invention, it is preferred because adhesive properties can be controlled optionally and widely by rubber-based, acrylic, vinyl acetate-based and dextrin-based adhesives. Adhesive properties are appropriately controlled taking account of the strength of the first base material and the second base material, and the adhesive strength between the first base material and the second base material. As described hereinafter, when the temporary adhesive layer **15*a*** is formed by a wet lamination method, vinyl acetate-based and/or dextrin-based adhesives are preferable.

In the temporary adhesive layer **15*a*, the amount of the temporary adhesive is preferably from 10 to 100% by mass, and more preferably from 20 to 80% by mass, based on the entire solid content of the temporary adhesive layer 15*a***.

The temporary adhesive layer 15*a* preferably contains an adhesive force modifier, in addition to the temporary adhesive.

Examples of the adhesive force modifier include waxes such as polyethylene wax, metal soap, inorganic pigments and organic pigment described above. These adhesive force modifiers exert the effect of being dispersed in the temporary adhesive layer 15*a*, thereby to decrease a cohesive force of the temporary adhesive layer 15*a*. By decreasing the cohesive force of the temporary adhesive layer 15*a*, it becomes possible to easily remove again the second base material.

In the temporary adhesive layer 15*a*, the amount of the adhesive force modifier is appropriately decided taking account of the adhesive strength between the first thermosensitive recording sheet 14 and the second base material 16 as well as the cohesive force of the temporary adhesive layer 15*a*. It is particularly preferred to add the adhesive force modifier in the amount enough to control the adhesive strength between the first thermosensitive recording sheet 14 and the second base material 16 within the following range. For example, the amount is preferably from 0 to 90% by mass, and more preferably from 20 to 80% by mass, based on the entire solid content of the temporary adhesive layer 15*a*.

The adhesive strength between the first thermosensitive recording sheet 14 and the second base material 16 in the temporary adhesive layer 15*a* is preferably from 50 to 1000 mN/25 mm (peeling rate: 300 mm/min.), and more preferably from 80 to 600 mN/25 mm (peeling rate: 300 mm/min.) as measured according to a T-type peeling test defined in JIS K 6854-3.

When the adhesive strength as measured according to a T-type peeling test is less than 50 mN/25 mm, the second base material may be peeled and curls and wrinkles occur, resulting in poor appearance. On the other hand, the adhesive strength as measured according to a T-type peeling test is more than 1000 mN/25 mm, the information non-disclosing portion of the second base material may be fractured during removing and also severe curling occurs in the flow direction, and thus the resulting sheet is formed into a cylindrical shape.

The adhesive strength as measured according to a T-type peeling test can be appropriately controlled by the kind of the temporary adhesive to be used, permeability to the second base material, the coating weight, the time required to laminate after coating, and the drying temperature.

The adhesive strength as measured according to a T-type peeling test defined in JIS K 6854-3 can be measured by the following procedure. That is, the sample is allowed to stand under an atmosphere at 23° C. and 50% RH for 24 or more and then a peeling test is conducted at a peeling rate of 300 mm/min. The adhesive strength is indicated by mN per a test sample width of 25 mm.

The temporary adhesive layer 15*a* can be formed by using a coating solution containing a temporary adhesive (a vinyl acetate-based temporary adhesive is formed into an aqueous emulsion, a water-soluble temporary adhesive (for example, dextrin-based temporary adhesive) is dissolved in water to prepare an aqueous solution, a solution obtained by using an organic solvent as a solvent), a solution containing no solvent, or a radiation curable solution. Water or an organic solvent can be used as the solvent of the coating solution, and water is preferably used in view of cost. Specifically, when using the coating solution, the temporary adhesive layer can be formed by coating a coating solution containing a temporary adhesive onto the first thermosensitive recording layer 13 or the second base material 16, followed by drying.

In the present invention, it is particularly preferred that the temporary adhesive layer 15*a* is formed by coating a coating solution containing a temporary adhesive onto the first thermosensitive recording layer 13 or the second base material 16, and laminating the first thermosensitive recording layer with the second base material, followed by drying, that is, a wet lamination method.

The wet lamination method has various advantages as compared with a dry lamination method of coating a coating solution onto the first thermosensitive recording layer, followed by drying and contact bonding with the second base material under high pressure. For example, lamination does not require high pressure. In case of the dry lamination method, contact bonding must be conducted under pressure of about 20 kg/cm. In case of the wet lamination method, the pressure is hardly required and temporary adhesion can be conducted even under pressure of about 1 kg/cm or less. As compared with the dry lamination method, the coating weight of the temporary adhesive layer 15*a* may be small. When the coating weight of the temporary adhesive layer 15*a* is small, in case of half-cut processing 17 between the information disclosing portion 16*a* and the information non-disclosing portion 16*b*, it is possible to allow the temporary adhesive to adhere to a blade used for processing with difficulty. Lamination with the second base material and drying require a short time. As the second base material, there can be used a material having a small thickness such as about 5 μm.

Therefore, mass production can be conducted with high speed, resulting in high productivity and low production cost. Since the thickness of the second base material 16 and the temporary adhesive layer 15*a* can be decreased, heat is smoothly transferred to the first thermosensitive recording layer 13 and clear recording can be conducted.

When the temporary adhesive layer is formed by the wet lamination method, at least one or both of the first base material and the second base material are preferably base materials having air permeability such as paper.

The coating solution can be coated by the same coating method as described in the thermosensitive recording layer 13.

The coating weight of the temporary adhesive layer 15*a* is preferably from 0.5 to 10 $g/m^2$, and more preferably from 1 to 5 $g/m^2$ because of excellent recording characteristics. When the coating weight of the temporary adhesive layer is 1 $g/m^2$, coating unevenness is less likely to occur. On the other hand, when the coating weight of the temporary adhesive layer is 5 $g/m^2$ or less, thermal transfer properties are improved.

The temporary adhesive layer 15*a* may be formed by the dry lamination method using an extrusion lamination method.

<Temporary Adhesive Layer 15>

In the present invention, the temporary adhesive layer 15 has the same constitution as in the above temporary adhesive layer 15*a*, except that it may contain a reactive dye and a developer, and it is removable again and is not reattachable.

In the present invention, the temporary adhesive layer 15 may contain a reactive dye (dye precursor) and a developer and therefore, when a thermosensitive recording treatment is conducted, the reactive dye reacts with the developer to develop a color at the heated portion.

The temporary adhesive layer 15 may be a single layer containing a reactive dye and a developer, or a multilayer comprising at least two layers of a layer containing a reactive dye and containing no developer and a layer containing a developer and containing no reactive dye. The temporary adhesive layer is preferably a single layer because it is excellent in reactivity and thermoresponse.

Various known reactive dyes and developers can be used and examples of specific combination of the reactive dye and the developer include a leuco compound (leuco dye) and an electron-accepting substance, an imino compound and an isocyanate compound, and a long chain fatty acid iron salt and a polyhydric phenol. Among these combinations, the combination of the leuco compound and the electron-accepting substance is preferable because of excellent thermoresponse, high color developing density and comparative stability. The combination of the imino compound and the isocyanate compound is preferable because an adverse influence of a surfactant is hardly exerted on color development and storage stability is excellent.

As the reactive dye and the developer, for example, there can be used the same reactive dye and developer as those described in the thermosensitive recording layer 13.

In the temporary adhesive layer 15, the amount of the reactive dye is preferably from 10 to 50% by mass, and more preferably from 10 to 20% by mass, based on the entire solid content of the temporary adhesive layer 15 taking account of color developing properties.

In the temporary adhesive layer 15, the amount of the developer is preferably from 100 to 700 parts by mass, and more preferably from 150 to 400 parts by mass, based on 100 parts by mass of the sum of reactive dye.

It is preferred that the temporary adhesive layer 15 further contains a sensitizer so as to control color developing sensitivity. As the sensitizer, there can be used compounds which have conventionally been known as the sensitizer of the thermosensitive recording material and examples thereof include an organic substance (hereinafter referred to as a thermofusible substance) which has comparatively low melting point and is excellent in compatibility with the reactive dye and the developer. The thermofusible substance is compatible with the reactive dye and the developer, thereby to enhance probability of contact between both components and to exert a sensitization action. Examples of the thermofusible substance include parabenzylbiphenyl, dibenzyl terephthalate, phenyl 1-hydroxy-2-naphthoate, dibenzyl oxalate, di-o-chlorobenzyl adipate, 1,2-di(3-methylphenoxy)ethane, di-p-methylbenzyl oxaliate, di-p-chlorobenzyl oxalate, 1,2-bis(3,4-dimethylphenyl)ethane and 1,3-bis(2-naphthoxy)propane.

In the temporary adhesive layer 15, the amount of the thermofusible substance is preferably from 25 to 500 parts by mass, and more preferably from 100 to 300 parts by mass, based on 100 parts by mass of the sum of the reactive dye.

The temporary adhesive layer 15 may further contain an image stabilizer for main purpose of improving storage life of thermosensitive recording images. As the image stabilizer, for example, there can be used those containing one or more kinds selected from phenolic compounds such as 1,1,3-tris (2-methyl-4-hydroxy-5-cyclohexylphenyl)butane, 1,1,3-tris (2-methyl-4-hydroxy-5-tert-butylphenyl)butane, 1,1-bis(2-methyl-4-hydroxy-5-tert-butylphenyl)butane, 4,4'-[1,4-phenylenebis(1-methylethylidene)]bisphenol and 4,4'-[1,3-phenylenebis(1-methylethylidene)]bisphenol; epoxy compounds such as 4-benzyloxyphenyl-4'-(2-methyl-2,3-epoxypropyloxy)phenylsulfone, 4-(2-methyl-1,2-epoxyethyl) diphenylsulfone and 4-(2-ethyl-1,2-epoxyethyl)diphenylsulfone; and isocyanuric acid compounds such as 1,3,5-tris(2,6-dimethylbenzyl-3-hydroxy-4-tert-butyl)isocyanuric acid. As a matter of course, image stabilizers are not limited to these compounds and two or more compounds can be used in combination.

In the temporary adhesive layer 15, the amount of the image stabilizer is preferably from 5 to 100 parts by mass, and more preferably from 10 to 60 parts by mass, based on 100 parts by mass of the sum of the reactive dye.

If necessary, the temporary adhesive layer 15 can further contain various additives used usually in the thermosensitive recording material. Examples of the additive include colored dye, fluorescent dye and defoamer.

The coating solution and the coating method of the temporary adhesive layer 15 may be the same as those in the temporary adhesive 15*a*.

<Second Base Material 16>

It is necessary that the second base material 16 has light transmission properties. As used herein, "light transmission properties" means the state that information recorded on the first thermosensitive recording layer 13 is visible from the outside, and the second base material may be completely transparent or translucent.

The material of the base material having light transmission properties includes a transparent material. There can also be used a translucent material capable of securing light transmission properties which allow information recorded on the first thermosensitive recording layer 13 to be visible from the outside.

Examples of the base material made of the transparent material include base materials (film base materials), which contain a synthetic resin as a main component, such as polyethylene terephthalate film, polybutylene terephthalate film, polyethylene film, polypropylene film, polycarbonate film, polyurethane film, polyimide film, polyvinyl chloride film, cellophane, cellulose triacetate film, cellulose diacetate film, tetrafluoroethylene film, polyvinylidene fluoride film and polymonochlorotrifluoroethylene film.

Examples of the base material made of the translucent material include a paper base material containing a pulp as a main component and a film base material, which contain a colorant such as white inorganic pigment. As the base material containing a pulp as a main component, for example, papers such as wood free paper, regenerated paper and glassine paper are usually used. A grassine paper is particularly preferable because of high density, high thermal conductivity and excellent transparency.

When the temporary adhesive layer is formed by the wet lamination method, as described above, the second base material is preferably an air-permeable base material, and particularly preferably a paper base material.

The second base material 16 is composed of an information disclosing portion 16*a* and an information non-disclosing portion 16*b*. To easily remove the first thermosensitive recording sheet 14 from the second base material, half-cut processing 17 extending from the second base material 16 to the first thermosensitive recording sheet 14 may be provided at any position.

When the second base material 16 has light transmission properties, in the information disclosing portion 16*a,* information recorded on the first thermosensitive recording layer is visible from the outside.

The second base material 16 also functions as a protective layer of the first thermosensitive recording layer. Therefore, as compared with the case where the thermosensitive recording layer is formed on the outer surface of the thermosensitive recording sheet, the sheet is less likely to be scratched and recording images are excellent in storage life.

The thickness of the second base material 16 is not specifically limited. The smaller the thickness, the larger the quantity of heat to be transferred to the first thermosensitive recording layer 13, the higher the recording density of information recorded on the first thermosensitive recording layer 13, and thus clear recording images are obtained. On the other hand, the larger the thickness, processability of the second base material 16 are improved and fracture is less likely to be caused in case of removing the information disclosing portion 16*b*. Therefore, the basis weight of the second base material 16 is preferably from 3 to 60 $g/m^2$, and more preferably from 5 to 40 $g/m^2$.

The higher the density of the second base material 16, the larger the quantity of heat to be transferred to the first thermosensitive recording layer 13, the higher the recording density of information recorded on the first thermosensitive recording layer 13, and thus clear recording images are obtained. In case of the base material containing a wood pulp as a main component, transparency is enhanced. Therefore, the density of the second base material 16 is preferably within a range from 0.80 $g/cm^3$ or more, and more preferably from 0.85 to 1.6 $g/cm^3$. In case of the paper base material, the density is preferably from 0.85 to 1.3 $g/cm^3$ and, in case of the film base material, the density is preferably from 0.9 to 1.6 $g/cm^3$.

<Shielding Layer 18>

The shielding layer 18 is formed so as to cover at least the entire information non-disclosing portion 16*b*. For example, as shown in FIGS. 1 and 2, the position of the shielding layer 18 may completely agree with the position of the information non-disclosing portion 16*b*, or the size of the shielding layer 18 may be larger than that of the information non-disclosing portion 16*b*.

The shielding layer 18 may be formed on the entire surface of the information non-disclosing portion, or may be in a predetermined shaped pattern (for example, strip, network, zigzag, character and design) and plural patterns may be formed on the information non-disclosing portion.

The shielding layer 18 is preferably formed by printing because it hardly inhibits thermal transfer to the first thermosensitive recording layer 13 and is capable of conducting thermosensitive recording in high recording density and also easily form a predetermined pattern at low cost.

The printing method is not specifically limited and there can be applied conventional methods such as offset printing system, gravure printing system and flexography system.

The shielding layer 18 is preferably formed by an inkjet recording apparatus or a thermal transfer recording apparatus. In this case, immediateness is excellent as compared with printing. That is, since it is not necessary to previously produce a plate, like printing, a pattern can be immediately changed. For example, an inkjet recording apparatus or a thermal transfer recording apparatus and a thermosensitive recording apparatus are arranged in series and, before or after recording confidential information by the thermosensitive recording apparatus, a shielding layer can be formed by the inkjet recording apparatus or the thermal transfer recording apparatus. At this time, it is possible to record any characters and images, in addition to the shielding layer, by the inkjet recording apparatus or the thermal transfer recording apparatus.

When using the thermal transfer recording apparatus, the temperature of a head of the thermal transfer recording apparatus is controlled to the temperature at which the second thermosensitive recording layer 13 does not develop a color.

The shielding layer 18 may be formed by attaching a base material having no light transmission properties such as metal foil or metal deposited film onto the information non-disclosing portion 16*b*.

The ink used in the shielding layer is preferably an ink containing a metal powder because a small amount of the metal powder exerts the shielding effect and thermal transfer to the first base material is not adversely affected. Examples of the metal powder include aluminum, zinc, tin, silver and gold powders. In view of economical efficiency and stability, an aluminum powder is preferable.

Examples of the aluminum powder pigment and aluminum paste (coating material containing an aluminum powder) include those described in detail in JIS K5906-1991, Convertec August 1995, pp. 46-49. Specifically, there can be used solvent-based pastes TD120T, TD180T, TD200T and TD280T and aqueous pastes 93-2070, 93-2071, 93-2072, 93-2073 and 93-2074 (manufactured by Toyo Aluminum K.K.); HR, CR-808CM, SF-808C, AW-7000R and AW-808C (manufactured by Asahi Kasei Corporation).

Various colored shielding layers can be obtained by adding various colored dyes and pigments to an ink containing a metal powder as a main component. It is preferred that an ink containing a white pigment such as titanium oxide, calcium carbonate, talc or clay is coated onto a shielding layer coated with an ink containing a metal powder and then required multicolor printing is conducted.

<Shielding Layer 19>

The shielding layer 19 is the same as the shielding layer 18, except that it is disposed at the position corresponding to the information non-disclosing portion 16*b* on the first base material 12 is transparent.

Although the shielding layer 19 is not essential in the present invention, security of confidential information is further improved by forming the shielding layer 19. That is, when the shielding layer 19 is formed, in case of viewing the thermosensitive multiple recording sheet from the side of the first base material 12, there can be reduced possibility that confidential information recorded on the first thermosensitive recording layer 13 inside the first base material 12.

The thermosensitive multiple recording sheet 11 of the present aspect can be used in the following manner. That is, by subjecting thermosensitive multiple recording sheet 11 to a thermosensitive recording treatment using a thermosensitive recording apparatus, disclosed information and non-disclosed information are simultaneously recorded on the first thermosensitive recording layer 13 to obtain an information recorded matter.

At this time, information (disclosed information) recorded underneath the information disclosing portion 16*a* of the second base material 16 is visible from the outside because the second base material 16 has light transmission properties. On the other hand, information (non-disclosed information) recorded underneath the information non-disclosing portion 16*b* of the second base material 16 is invisible from the outside because of the existence of the shielding layer 18. Even if the information recorded matter is made to see through light by a third party, the non-disclosed information may not be known. These effects are further improved by forming the shielding layer 19.

When the person having the right to know recorded non-disclosed information gets the resulting information recorded matter and removes the second base material 16 and the shielding layer 18, he can get non-disclosed information recorded underneath them after looking it.

At this time, when a third party looked non-disclosed information after removing the second base material 16 before the person having the right to know recorded non-disclosed information gets the information recorded matter, it is difficult to reattach the second base material 16 through the temporary adhesive layer 15*a*, and thus it is found that whether or not someone else looked at the information non-disclosing portion 16*b* after removing the second base material 16 before the person himself confirms.

<<Second Embodiment>>

Figure 3:
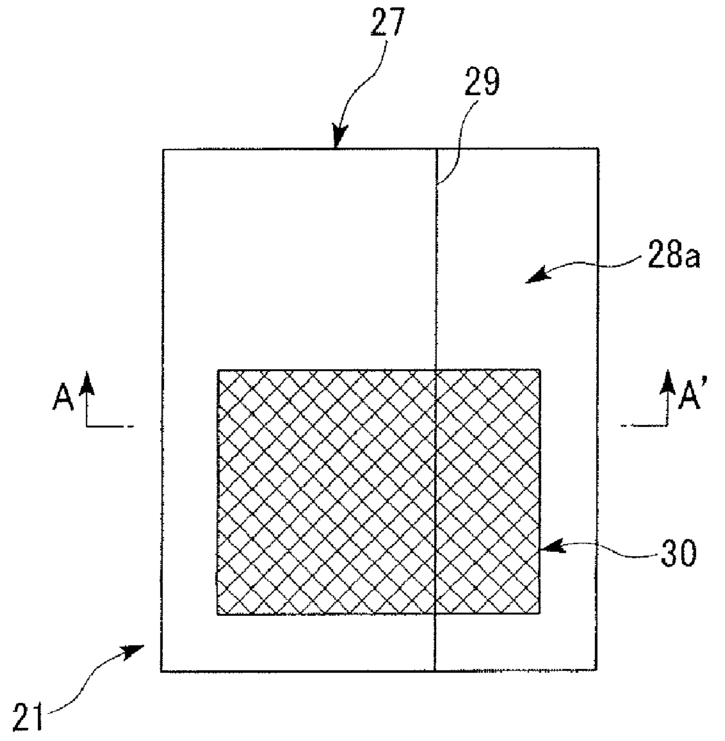
FIG. 3 is a top view showing the second embodiment of a thermosensitive multiple recording sheet according to the present invention.
Figure 4:
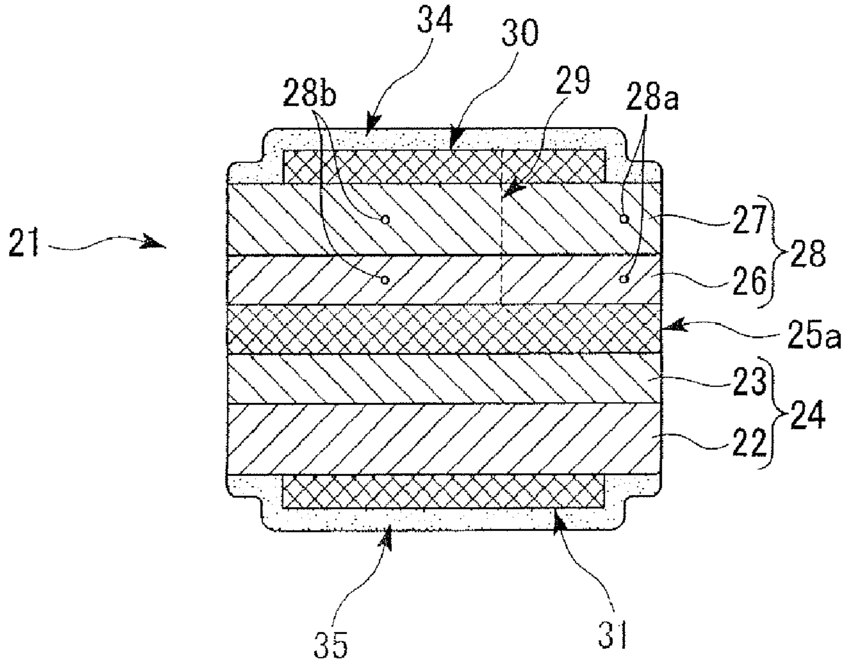
FIG. 4 is a longitudinal sectional view taken along lines A-A' of the thermosensitive multiple recording sheet shown in FIG. 3.
Figure 7:
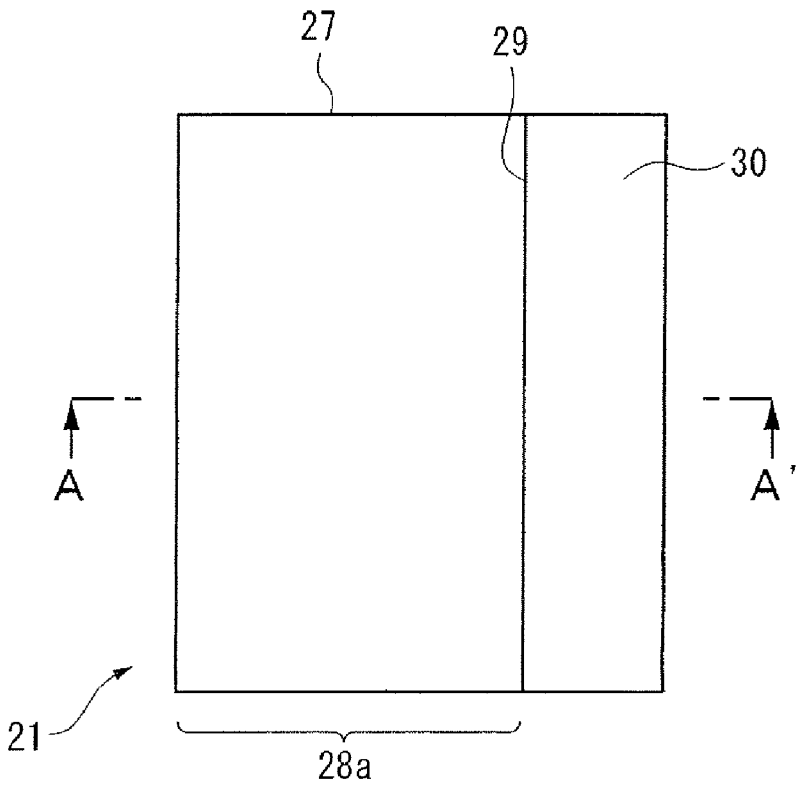
FIG. 7 is a top view showing the second embodiment of a thermosensitive multiple recording sheet according to the present invention.
Figure 8:
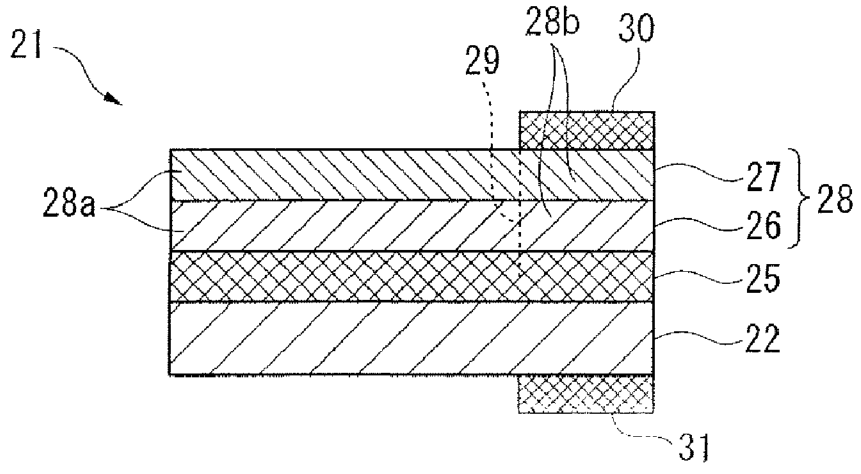
FIG. 8 is a longitudinal sectional view taken along lines A-A' of the thermosensitive multiple recording sheet shown in FIG. 7.
Figure 9:
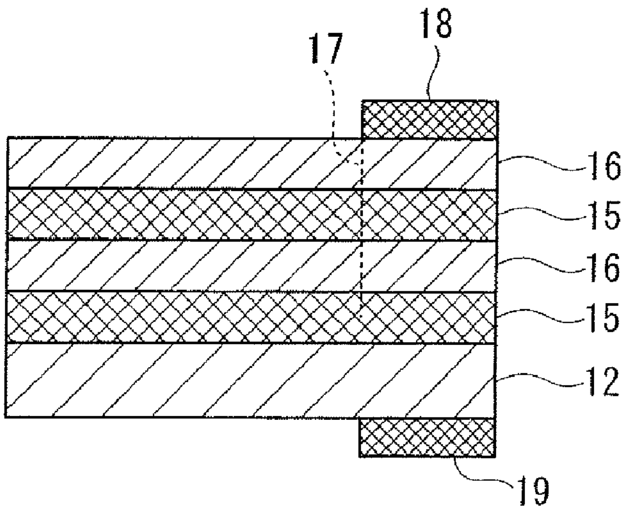
FIG. 9 is a longitudinal sectional view showing the other embodiment of a thermosensitive multiple recording sheet according to the present invention.
Figure 10:
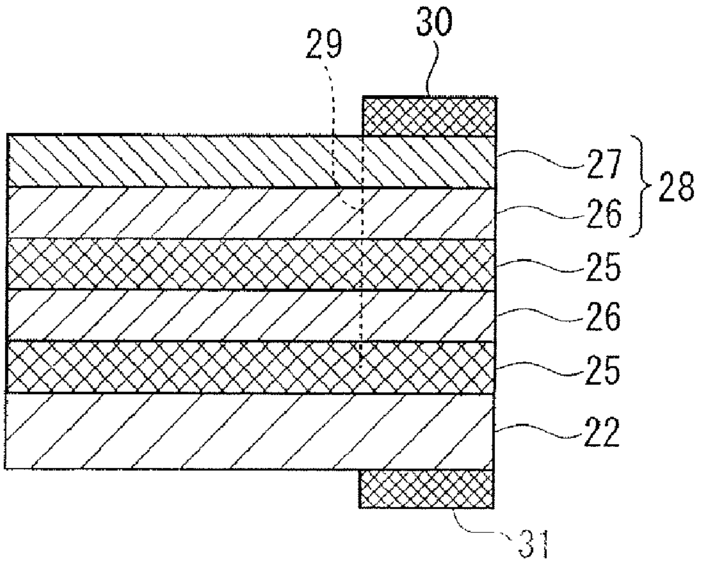
FIG. 10 is a longitudinal sectional view showing the other embodiment of a thermosensitive multiple recording sheet according to the present invention.

In FIGS. 3 to 4 and 7 to 8, the second embodiment the thermosensitive multiple recording sheet according to the present invention is shown. FIGS. 3 and 7 are top views showing a thermosensitive multiple recording sheet 21 of the present embodiment, and FIGS. 4 and 8 are longitudinal sectional views taken along lines A-A' in FIGS. 3 and 7.

The thermosensitive multiple recording sheet 21 is obtained by attaching second base material 26 of a second thermosensitive recording sheet 28 comprising the second base material 26 and a second thermosensitive recording layer 27 formed on one surface of the second base material 26 through a temporary adhesive layer 25*a*, onto a first thermosensitive recording layer 23 of a first thermosensitive recording sheet 24 comprising a first base material 22 and the first thermosensitive recording layer 23 formed on the first base material 22.

The second thermosensitive recording sheet 28 is composed of an information disclosing portion 28*a* and an information non-disclosing portion 28*b*, and the information disclosing portion 28*a* is cut from the information non-disclosing portion 28*b* by half-cut processing 29.

At the position corresponding to the information non-disclosing portion 28*b* on the second thermosensitive recording sheet 28, a shielding layer 30 is formed. At the position corresponding to the information non-disclosing portion 28*b* on the first base material 22, a second shielding layer 31 is formed. An ultraviolet curable resin layer 35 is formed so as to cover the back surface of the second base material 22 and the second shielding layer 31.

An ultraviolet curable resin layer 34 is formed so as to cover the surface of the first thermosensitive recording sheet 27 and the first shielding layer 30.

Although the ultraviolet curable resin layers 34, 35 are not essential, water resistance and scratch resistance are enhanced by forming these layers and performances close to those of a plastic card are attained, and thus it is preferable.

The second base material 28 is cut by half-cut processing 29 at any position.

Although the half-cut processing 29 is not essential, it becomes easy to remove the first thermosensitive recording sheet 24 from the thermosensitive recording sheet 28, and thus it is preferable.

The thermosensitive multiple recording sheet 21 of the present embodiment is different from that of the first embodiment in that the second thermosensitive recording layer 27 is formed on one surface of the second base material 26 and the second base material 26 may not have light transmission properties. That is, by forming the second thermosensitive recording layer 27 on the second base material 26, disclosed information is simultaneously recorded on the first thermosensitive recording layer 23 and the second thermosensitive recording layer 27, and thus disclosed information recorded on the first thermosensitive recording layer 23 is visibly displayed.

With the constitution, the thermosensitive multiple recording sheet 21 has an advantage that it enables clear printing having high contrast to the information disclosing portion 28*a*.

Descriptions about the first base material 22, the first thermosensitive recording layer 23r the first thermosensitive recording sheet 24, temporary adhesive layer 25*a*, temporary adhesive layer 25, the information disclosing portion 28*a*, the information non-disclosing portion 28*b* and the shielding layer 30, 31 are the same as those in the first base material 12, the first thermosensitive recording layer 13, the first thermosensitive recording sheet 14, temporary adhesive layer 15*a*, the temporary adhesive layer 15, the information disclosing portion 16*a*, the information non-disclosing portion 16*b* and the shielding layer 18, 19 in the first embodiment.

Although second base material 26 may be the same material as in the first base material, the second base material 26 may not have light transmission properties.

The components constituting the second thermosensitive recording layer 27 may be the same components as in the first thermosensitive recording layer 13 in the first embodiment.

Similar to the first thermosensitive recording layer, the second thermosensitive recording layer 27 can be formed by coating a coating solution containing various components constituting the second thermosensitive recording layer 27 onto the second base material 26.

At this time, the second thermosensitive recording layer 27 is preferably formed after attaching the second base material 26 onto the first thermosensitive recording layer 23 through the temporary adhesive layer 25. Consequently, there can be obtained a thermosensitive multiple recording sheet which is less likely to cause wrinkles in the second base material 26 and is excellent in appearance. The smaller the thickness of the second base material 26, the more the recording density of the first thermosensitive recording layer 23 is improved, however processability deteriorates. When using a paper base material, there arises a problem that it absorbs water in case of forming the temporary adhesive layer 25 thereby to cause extension, wrinkles and paper breakage. Also when using a film base material, the film has poor stiffness and deformation such as wrinkles arises and it becomes difficult to handle. These problems can be solved by forming the second thermosensitive recording layer 27 on the second base material 26 after attaching through the temporary adhesive layer 25.

The thermosensitive multiple recording sheet 21 of the present aspect can be used in the following manner. That is, by subjecting thermosensitive multiple recording sheet 21 to a thermosensitive recording treatment using a thermosensitive recording apparatus, disclosed information and non-disclosed information are simultaneously recorded on the first thermosensitive recording layer 23 to obtain an information recorded matter.

At this time, information (disclosed information) recorded underneath the information disclosing portion 28*a* of the second base material 28 is visible from the outside because the information is also recorded on the second thermosensitive recording layer 27. On the other hand, information (non-disclosed information) recorded underneath the information non-disclosing portion 28*b* of the second thermosensitive recording sheet 28 is not invisible from the outside because of the existence of the shielding layer 30. Even if the information recorded matter is made to see through light by a third party, the non-disclosed information may not be known. These effects are further improved by forming the shielding layer 31.

When the person having the right to know recorded non-disclosed information gets the resulting information recorded matter and removes the information non-disclosing portion 28*b* of the second thermosensitive recording sheet 28 and the shielding layer 30, he can get non-disclosed information recorded underneath them after looking it.

At this time, when a third party looked non-disclosed information after removing the information non-disclosing portion 28*b* of the second thermosensitive recording sheet 28 before the person having the right to know recorded non-disclosed information gets the information recorded matter, it is difficult to reattach the second thermosensitive recording sheet 28 through the temporary adhesive layer 25, and thus it is found that whether or not someone else looked at the information non-disclosing portion 28*b* of the second thermosensitive recording sheet 28 before the person himself confirms.

In the present embodiment, the information disclosing portion 28*a* can be removed and kept. Specifically, it is possible to provide the first thermosensitive recording sheet 24 as a receipt and to keep the information disclosing portion 28*a* as its office copy.

The thermosensitive multiple recording sheet of the present invention is not limited to the above-described embodiment.

In the first and second embodiments, the second base material is cut by half-cut processing, but the present invention is not limited thereto. For example, the second base material is cuttable by providing the second base material with perforation.

In the first and second embodiments, the second shielding layer is formed at the position corresponding to the information non-disclosing portion on the back surface of the first base material so that confidential information recorded on the second thermosensitive recording layer is not visible from the back surface. However, the present invention is not limited thereto and the second shielding layer may be formed on the entire first base material. The second shielding layer may not be formed. When using, as the first base material, a colored base material capable of discriminating recording of the first thermosensitive recording layer or a base material containing titanium dioxide for reducing light transmission properties added internally, the same effect is exerted.

In the above-described first embodiment, although the shielding layer 18 is formed on the surface of the second base material 16, the second thermosensitive recording layer may be formed between the second base material 16 and the shielding layer 18, similar to the second embodiment.

In the above-described second embodiment, although the second base material 26 of the second thermosensitive recording sheet 28 is attached onto the First thermosensitive recording layer 23 through the temporary adhesive layer 25, the second thermosensitive recording layer 27 of the second thermosensitive recording sheet 28 may be attached.

In the above-described second embodiment, although the shielding layer 30 is formed on the surface of the second thermosensitive recording layer 27, the same base material having light transmission properties as the second base material 16 in the first embodiment may be attached onto the surface of the second thermosensitive recording layer 27 through the temporary adhesive layer.

In the above-described second embodiment, a plurality of the second thermosensitive recording sheets 28 may be formed. In this case, the shielding layer 30 may be formed on the second thermosensitive recording layer 27 as an outermost layer.

In the thermosensitive multiple recording sheet of the present invention, optional characters and images may be printed on the first base material and/or the second base material for the purpose except for shielding.

In the thermosensitive multiple recording sheet of the present invention, a releasant layer may be formed between the first thermosensitive recording layer and the second base material, for example, the surface of the temporary adhesive layer side of the second base material and the surface of the temporary adhesive layer side of the first thermosensitive recording layer. The releasant layer can be formed by coating a releasant such as silicone resin or polyethylene wax.

In the thermosensitive multiple recording sheet of the present invention, an under coat layer can be formed between the first base material and the first thermosensitive recording layer. The under coat layer is usually a layer composed mainly of a pigment and an adhesive and an under coat layer, which has conventionally been used in a known thermosensitive recording material, can be used as the under coat layer. By using, as the pigment of the under coat layer, a pigment having high porosity such as silica or calcined kaolin, color developing sensitivity of the thermosensitive recording layer on the under coat layer can be enhanced. When the under coat layer contains a plastic pigment, hollow particles or foam, it is effective to improve color developing sensitivity of the thermosensitive recording layer to be formed on the under coat layer.

In the thermosensitive multiple recording sheet of the present invention, a protective layer can be formed on the first thermosensitive recording layer and/or the second thermosensitive recording layer. The protective layer is usually a layer composed mainly of a pigment and an adhesive and a protective layer, which has conventionally been used in a known thermosensitive recording material, can be used as the protective layer. For the purpose of preventing sticking to the thermal head, a lubricant such as polyolefin wax or zinc stearate is preferably added to the protective layer. The protective layer can also contain an ultraviolet absorber. Added value of the product can also be enhanced by forming a glossy protective layer. The protective layer may be single layer, or may be composed of two or more layers.

As the method for forming each layer on the base material, there may be used any known coating methods such as air knife method, blade method, gravure method, roll coater method, spraying method, dipping method, bar method and extrusion method.

In the thermosensitive multiple recording sheet of the present invention, a backing layer can also be formed on the back surface of the first base material so as to suppress penetration of an oil or plasticizer from the back surface of the first base material or to control curling.

The thermosensitive multiple recording sheet of the present invention can be formed into a thermosensitive recording material having higher function by processing For example, when an adhesive compound, a remoistening adhesive or a delayed tack adhesive compound is coated onto the back surface of the first base material, the resulting product can be used as an adhesive paper, a remoistening adhesive paper or a delayed tack paper. When the back surface is subjected to a magnetic treatment, a thermosensitive recording material having a layer capable of performing magnetic recording (magnetic recording layer) formed on the back surface can be obtained. Also a stripe-shaped magnetic recording layer may be formed on a portion of the surface.

As described above, the thinner the second base material, the more the quantity of heat to be transferred to the first thermosensitive recording sheet increases, thus resulting in clear recording. Therefore, it is required that the second base material is thin. According to a conventional production method, a desired copy paper is produced by separately producing a second thermosensitive recording sheet and a first thermosensitive recording sheet, followed by a temporary adhesion treatment. When a base material containing a wood pulp as a main component is used in case of producing a thin second base material having a basis weight of 5 to 40 g/$m^2$ and a density of 0.85 to 1.3 g/$cm^3$, preferably a basis weight of 10 to 30 g/$m^2$ and a density of 0.85 to 1.3 g/$cm^3$, the base material absorbs water when aqueous thermosensitive coating material is coated onto the base material, thereby to cause problems that surface waviness and wrinkles occur and paper breakage occur during coating because of lowering of durability of a raw paper.

When using a base material containing a wood pulp as a main component as a thin second base material having a basis weight of 5 to 40 g/$m^2$ and a density of 0.9 to 1.6 g/$cm^3$, preferably a basis weight of 10 to 30 g/$m^2$ and a density of 0.9 to 1.6 g/$cm^3$, in case of coating an aqueous thermosensitive coating material, there arise a problem that extension occurs by heat during the drying step and wrinkles partially occur because the base material is thin and is not easy to handle.

To solve the these problems, according to the present invention, a thermosensitive multiple recording sheet is produced through the first step of obtaining a laminated sheet comprising a first thermosensitive recording sheet, a temporary adhesive layer and a second base material and the second step of forming a thermosensitive recording layer on the surface of the second base material in the laminated sheet obtained by the first step by attaching, as the second base material, a thin base material containing a wood pulp as a main component or a base material containing a synthetic resin as a main component on the recording layer of the first thermosensitive recording sheet through the temporary adhesive layer, the second base material having a basis weight of 5 to 40 g/$m^2$ and a density of 0.85 to 1.3 g/$cm^3$ in case of a paper base material or a density of 0.9 to 1.6 g/$cm^3$ in a film base material, and preferably a basis weight of 10 to 30 g/$m^2$ and a density of 0.85 to 1.3 g/$cm^3$ in a paper base material or a density of 0.9 to 1.6 g/$cm^3$ in a film base material.

A plurality of second thermosensitive recording sheets may be formed. In this case, a temporary adhesive layer is further formed on the laminated thermosensitive recording sheet obtained after the second step, and a thin base material containing a wood pulp as a main component or a base material containing a synthetic resin as a main component is attached as the base material, the base material having a basis weight of 5 to 40 g/$m^2$ and a density of 0.85 to 1.3 g/$cm^3$ in case of a paper base material or a density of 0.9 to 1.6 g/$cm^3$ in a film base material, and preferably a basis weight of 10 to 30 g/$m^2$ and a density of 0.85 to 1.3 g/$cm^3$ in a paper base material or a density of 0.9 to 1.6 g/$cm^3$ in a film base material, and then an additional thermosensitive recording layer is formed.

The second base material containing a wood pulp as a main component is usually a wood free paper or a regenerated paper. Examples of the base material containing a synthetic resin as a main component include polyethylene terephthalate film, polybutylene terephthalate film, polyethylene film, polypropylene film, polycarbonate film, polyurethane film, polyimide film, polyvinyl chloride film, cellophane, cellulose triacetate film, cellulose diacetate film, tetrafluoroethylene film, polyvinylidene fluoride film and polymonochlorotrifluoroethylene film, and it is preferred that these base materials contain a white inorganic pigment.

The base material of the first thermosensitive recording sheet is not specifically limited and a paper and various synthetic resins are appropriately used, if necessary. Among these, a paper is used most usually. In view of adhesive aptitude and handling properties, the thickness is preferably from 40 to 100 μm.

The temporary adhesive is not specifically limited, but acrylic, rubber-based and vinyl acetate-based adhesives can be used because adhesion properties can be controlled optionally and widely, and are used in the form of aqueous emulsion, a solution obtained by using an organic solvent, a solution containing no solvent, or a radiation curable solution. To conduct temporary adhesion of the second base material in a roll shape in the present invention, the adhesive is preferably coated onto the thermosensitive recording layer of the first thermosensitive recording sheet in an undried state and then dried as compared with the case of contact-bonding after drying. The adhesive is preferably a vinyl acetate-based adhesive because a rigid temporary adhesive layer can be formed. The coating weight of the adhesive is preferably from about 1 to 5 g/$m^2$.

The adhesive strength between the first thermosensitive recording sheet and the second thermosensitive recording sheet using a temporary adhesive, as measured according to a T-type peeling test method, is preferably from 50 to 1000 mN/25 mm (testing speed: 300 mm/min.), and more preferably from 80 to 600 mN/25 mm (testing speed: 300 mm/min.).

When the adhesive strength as measured according to a T-type peeling test method is less than 50 mN/25 mm, there may arise a problem that curling and wrinkles of the second thermosensitive recording sheet may be caused by stress between rolls in case of coating the thermosensitive layer in the second step, resulting in peeling.

On the other hand, when the adhesive strength as measured according to a T-type peeling test method is more than 1000 mN/25 mm, fracture may occur in case of removing and also severe curling occurs in the flow direction, and thus the resulting sheet is formed into a cylindrical shape.

The adhesive strength as measured according to a T-type peeling test can be appropriately controlled by the kind of the adhesive to be used, permeability to the second base material, the coating weight, the time required to laminate after coating, and the drying temperature.

The adhesive strength was measured by the following procedure according to a T-type peeling test.

Adhesive strength as measured according to T-type peeling test

The sample was allowed to stand under an atmosphere at 23° C. and 50% RH for 24 or more and then a peeling test was conducted at a testing rate of 300 mm/min. according to the method defined in ISO 11339: 2003. The adhesive strength was indicated by mN per a test sample width of 25 mm.

As the adhesion method, there can be used wet lamination and dry lamination methods which are usually used in this art. That is, a temporary adhesive paste is coated onto the back surface of a second base material and dried, and then the second base material is laminated with a first thermosensitive recording sheet by applying pressure or heat. Alternatively, a temporary adhesive paste is coated onto the thermosensitive recording surface of a first thermosensitive recording sheet and dried, and then the thermosensitive recording surface is laminated with the back surface of a second base material by applying pressure or heat. As described above, in the present invention, the wet lamination method of coating a temporary adhesive paste, followed by lamination in an undried state and further drying is a preferable method because the step of contact-bonding with a paste can be omitted. When an adhesive layer is formed by the wet lamination method, the second base material is preferably a paper.

As the thermosensitive color developing component of the thermosensitive recording layer of the present invention, conventionally known color developing components can be applied. Typical examples thereof include color developing component obtained by reacting a leuco dye with an electron-accepting substance, color developing component obtained by reacting an imino compound with an isocyanate compound and color developing component obtained by reacting a long chain fatty acid iron salt with a polyhydric phenol. Particularly, a color developing component obtained by reacting a leuco dye with an electron-accepting substance is preferably used.

The thermosensitive recording layer composed of a coated layer containing, as main components, a leuco compound and an electron-accepting compound, which is brought into contact with the leuco compound, thereby allowing it to develop a color, is formed as a coated layer made of a coating agent prepared by mixing a leuco compound, an electron-accepting compound and a binder, as essential components, with known additives such as pigment, surfactant and thermofusible substance (lubricant).

These leuco compounds may be used alone or in combination and examples thereof are the same as those described in the first thermosensitive recording layer 13.

The electron-accepting compound, which is brought into contact with the leuco compound, thereby allowing it to develop a color, is not specifically limited and examples thereof are the same as those described in the first thermosensitive recording layer 13.

The developer is preferably used in the amount within a range from 100 to 700 parts by mass, and more preferably from 150 to 400 parts by mass, based on 100 parts by mass of the sum of the dye precursor. As a matter of course, two or more developers can also used in combination.

In the present invention, an image stabilizer may be used for the purpose of improving storage life of color developed recording images. Examples of the image stabilizer are the same as those described in the first thermosensitive recording layer 13. As a matter of course, the image stabilizer is not limited thereto and two or more developers can also used in combination, if necessary.

To adjust color developing sensitivity of the thermosensitive recording layer of the thermosensitive recording material, the thermosensitive recording layer can contain a thermofusible substance as a sensitizer. As the sensitizer, there can be used compounds which have conventionally been known as the sensitizer of the thermosensitive recording material, and examples thereof are the same as those described in the first thermosensitive recording layer 13.

Additives such as developer, image stabilizer and sensitizer used in the present invention may be dispersed in water by the same method as in case of using a dye precursor in a state of fine solid particles and then mixed in case of preparing a coating material for forming a thermosensitive recording layer. After these additives are dissolved in a solvent, the resulting solution can be emulsified into water using a water-soluble polymer compound as an emulsifier.

In the present invention, the thermosensitive recording layer can contain fine pigment particles having high whiteness and an average particle size of 10 μm or less for the purpose of improving whiteness of the thermosensitive recording layer and improving uniformity of images. Examples thereof are the same as those described in the first thermosensitive recording layer 13. To prevent deposition of the sludge onto the thermal head and sticking, a pigment having an oil absorption amount of 50 ml/100 g is preferably used. The amount of the pigment is preferably the amount which does not decrease the color developing density, that is, 50% by mass or less based on the solid content of the thermosensitive recording layer.

In the present invention, an adhesive is used as the other component material constituting the thermosensitive recording layer and, if necessary, a crosslinking agent, waxes, a metal soap, a colored dye, a colored pigment and a fluorescent dye can be used. Examples of the adhesive are the same as those described in the first thermosensitive recording layer 13.

To improve water resistance of the thermosensitive recording layer, the thermosensitive recording layer can contain a crosslinking agent for three-dimensional curing of the adhesive. Examples thereof are the same as those described in the first thermosensitive recording layer 13 and at least one crosslinkable compound selected from among them is preferably used in the amount within a range from 1 to 10% by weight based on the entire solid content of the thermosensitive recording layer.

To the thermosensitive recording layer, waxes can be added and examples thereof include waxes such as paraffin wax, carnauba wax, microcrystalline wax, polyolefin wax and polyethylene wax; and higher fatty acid amides and higher fatty acid esters, such as stearic acid amide and ethylenebisstearic acid amide, and derivatives thereof. When methylolated fatty acid amide is added to the thermosensitive recording layer, sensitization effect can be exerted without adversely affecting surface fogging resistance.

Examples of the metal soap, which can be added to the thermosensitive recording layer, include higher fatty acid polyhydric metal salts such as zinc stearate, aluminum stearate, calcium stearate and zinc oleate. If necessary, various additives such as oil repellent, defoamer and viscosity modifier can be added in the thermosensitive recording layer as far as the effect of the present invention is not adversely affected.

The kind and amount of the leuco dye, developer and other various components used in the thermosensitive recording layer are appropriately adjusted according to the purposes. Usually, the amount of the developer is from 100 to 700 parts by mass, the amount of the sensitizer is from 25 to 500 parts by mass and the amount of the fine pigment particles is from 10 to 500 parts by mass, based on 100 parts by mass of the leuco dye, and the amount of the adhesive is from about 10 to 25% by mass based on the entire solid content.

In the present invention, the thermosensitive multiple recording material can be formed into a thermosensitive recording material having higher function by processing. For example, when an adhesive compound, a remoistening adhesive or a delayed tack adhesive compound is coated onto the back surface of the first base material, the resulting product can be used as an adhesive paper, a remoistening adhesive paper or a delayed tack paper. When the back surface is subjected to a magnetic treatment, a thermosensitive recording material having a layer capable of performing magnetic recording formed on the back surface can be obtained.

In the present invention, a protective layer can be formed on the thermosensitive recording layer and an under coat layer can be formed under the first thermosensitive recording layer. As these additional layers, there can be employed a protective layer and an under coat layer, which are used in conventionally known thermosensitive recording materials. Both the protective layer and the under coat layer are mainly composed of a pigment and an adhesive. For the purpose of preventing sticking to the thermal head, a lubricant such as polyolefin wax or zinc stearate is preferably added to the protective layer. The protective layer can also contain an ultraviolet absorber. Added value of the product can also be enhanced by forming a glossy protective layer. The protective layer may be single layer, or may be composed of two or more layers.

By using, as the pigment of the under coat layer, a pigment having high porosity such as silica or calcined kaolin, color developing sensitivity of the thermosensitive recording layer on the under coat layer can be enhanced. When the under coat layer contains a plastic pigment, hollow particles or foam, it is effective to improve color developing sensitivity of the thermosensitive recording layer to be formed on the under coat layer.

It is also possible to form a protective layer containing a UV curable resin and an EB curable resin on the thermosensitive recording layer of the present invention. The thermosensitive recording material of the present invention can be employed as a linerless adhesive label by using a releasant such as silicone in the protective layer and subjecting the back surface of the thermosensitive recording sheet to an adhesion treatment.

When required information is previously printed before a temporary adhesive is coated onto the surface on which the thermosensitive recording layer is formed and/or the thermosensitive recording surface of the first thermosensitive recording sheet, and printing is previously conducted before the thermosensitive recording layer is formed on the surface on which the thermosensitive recording layer is formed of the second base material, and also the thermosensitive recording layer of the second thermosensitive recording sheet is subjected to shield printing so as to shield these printed informations, and thus the effect of preventing forgery can be expected and its use range noticeably increases, and it is preferable.

As the method of forming each layer on the base material, there can be employed any of known coating methods such as air knife method, blade method, gravure method, roll coater method, spraying method, dipping method, bar method and extrusion method. A coating material for thermosensitive recording layer is coated on one surface of the base material in a dry coating weight of 1 to 10 $g/m^2$ in case of the second thermosensitive recording layer and the first thermosensitive recording layer, and thus a thermosensitive recording layer is formed. It is also possible to suppress penetration of an oil or plasticizer from the back surface of the recording material and to form a backing layer so as to control curling. It is effective to enhance color developing sensitivity by subjecting the thermosensitive recording layer to a smoothing treatment using a known smoothing method such as super calendaring or soft calendaring. The surface of the thermosensitive recording layer may be treated by bringing it into contact with any of a metal roll and elastic roll of a calendar.

The method for producing a thermosensitive recorded matter of the present invention is a method which is conducted using a thermosensitive multiple recording sheet comprising a first thermosensitive recording sheet comprising a first base material and a first thermosensitive recording layer formed on one side of the first base material and a second thermosensitive recording sheet comprising a second base material and a second thermosensitive recording layer formed on one side of the second base material, the second thermosensitive recording sheet being laminated onto the side of the first thermosensitive recording layer through a temporary adhesive layer, the method being characterized by comprising the following two steps:

the step of subjecting the thermosensitive multiple recording sheet to thermosensitive recording through thermal energy T1, which enables the second thermosensitive recording layer to develop a color and also enables the first thermosensitive recording layer to develop no color, from the second thermosensitive recording layer of the thermosensitive multiple recording sheet, thereby to record a recording A on the second thermosensitive recording layer (hereinafter referred to as the step A, sometimes), and the step of subjecting the thermosensitive multiple recording sheet to thermosensitive recording through thermal energy T2, which enables the first thermosensitive recording layer to develop a color, from the side of the second thermosensitive recording layer of the thermosensitive multiple recording sheet, thereby to record a recording B, which is different from the recording A, on the first thermosensitive recording layer (hereinafter referred to as the step B, sometimes)

In the step A, the recording A is recorded on the second thermosensitive recording layer through thermal energy T1.

The recording A is not specifically limited and may be optional characters or images. Particularly in the production method of the present invention, the recording A is preferably a blindfolding printing portion so as to obtain an information recorded matter having high security to information recorded only on the first thermosensitive recording layer, for example, various private informations and confidential informations. Consequently, the blindfolding printing portion may not be separately formed on the second thermosensitive recording layer by the other recording system such as printing, and thus productivity is more improved and the cost is reduced.

By forming the blindfolding printing portion on the second thermosensitive recording layer, thermal transfer is less likely to be suppressed in case of thermosensitive recording on the first thermosensitive recording layer, as compared with the case of forming the blindfolding printing portion on the second thermosensitive recording layer by printing, and thus thermosensitive recording can be conducted at high recording density.

The blindfolding printing portion may be formed on the second thermosensitive recording layer entirely or partially. The blindfolding printing portion may be entirely coated or provided with plural predetermined shaped patterns (for example, strip, network, zigzag, character and design).

As described hereinafter, when the recording B recorded on the first thermosensitive recording layer is composed of disclosed information and non-disclosed information, the blindfolding printing portion is preferably formed at the position corresponding to the non-disclosed information of the second thermosensitive recording layer (information non-disclosing portion). Consequently, in the step B, disclosed information is recorded on the first thermosensitive recording layer by thermosensitive recording through thermal energy T2 and is also recorded on the second thermosensitive recording layer. On the other hand, non-disclosed information is recorded on the first thermosensitive recording layer, but can not be recorded on the second thermosensitive recording layer to the degree to be discriminated.

Therefore, like receipts, detailed payroll sheets, various notifications and medical check-up results notifications, the resulting thermosensitive recorded matter can be widely employed as an information recorded matter in which confidential information is recorded inside a multiple sheet and disclosed information capable of being confirmed by any one is recorded on the surface of the multiple sheet.

In this case, the blindfolding printing portion may be formed at least on the entire information non-disclosing portion and, for example, the position of the blindfolding printing portion may completely agree with the position of the information non-disclosing portion, or the size of blindfolding printing portion may be larger than that of the information non-disclosing portion.

The blindfolding printing portion may be formed on the entire surface of the information non-disclosing portion, and a plurality of the above-described patterns having a predetermined shape may be formed at the information non-disclosing portion.

In the step B, the recording B is recorded on the first thermosensitive recording layer through thermal energy T2.

At this time, when the blindfolding printing portion is not formed on the second thermosensitive recording layer, the same recording B is also recorded on the second thermosensitive recording layer through thermal energy T2 and thus the recording B is visible from the outside.

In the step B, the recording B to be recorded on the first thermosensitive recording layer through thermal energy T2 is not specifically limited as far as it is different form the recording A, and may be optional characters or images.

The recording B is particularly preferably character information, for example, information described in receipts, detailed payroll sheets, various notifications and medical check-up results notifications. These informations are composed of informations (non-disclosed informations) such as private information and confidential information, which are intended to be invisible from the outside, and informations (disclosed informations) such as personal name and address of an individual having the right to know the non-disclosed information, which are intended to be visible from the outside.

In the present invention, the step A and the step B may be conducted separately or simultaneously.

As used herein, "conducted separately" means that the recording B is recorded after recording the recording A using a thermal head, or the recording A is recorded after recording the recording B using a thermal head. At this time, the recording A and the recording B can be recorded using two thermal heads disposed in series. Using one thermal head, one recording may be conducted, and then the other recording may be conducted using the other thermal energy.

As used herein, "conducted simultaneously" means that recording of the recording A through thermal energy T1 and recording of the recording B through thermal energy T2 are allowed to simultaneously proceed using one thermal head.

When the step A and the step B are separately conducted, the step B may be conducted after conducting the step A, or the step A may be conducted after conducting the step B.

The thermosensitive multiple recording sheet used in the present invention is not limited to the above-described examples.

For example, in the above-described examples, the information disclosing portion is cut from the information non-disclosing portion by half-cut processing. However, the present invention is not limited thereto and, for example, the half-cut processing may not be applied and also it may be cuttable by providing perforation in place of the half-cut processing.

In the above-described examples, in the first thermosensitive recording layer 23, the shielding layer 31 is formed at the position corresponding to the information non-disclosing portion 28*b* on the back surface of the first base material 22 so that recorded confidential information recorded is not visible from the back surface. However, the present invention is not limited thereto and, for example, the shielding layer 31 may be formed on the entire first base material 22 and the shielding layer 31 may not be formed. For example, when using, as the first base material 22, a colored base material capable of discriminating recording of the first thermosensitive recording layer when the second thermosensitive recording sheet is removed, or a base material containing titanium dioxide or the like internally for reducing light transmission properties, the same effect is exerted.

In the above-described examples, although the second base material 26 of the second thermosensitive recording sheet 28 is attached onto the first thermosensitive recording layer 23 through the temporary adhesive layer 25, the second thermosensitive recording layer 27 of the second thermosensitive recording sheet 28 may be attached.

Also a base material having light transmission properties may be attached onto the surface of the second thermosensitive recording layer 27 through the temporary adhesive layer.

A plurality of the first thermosensitive recording sheets 24 and the second thermosensitive recording sheets 28 may be provided and, for example, the same information may be recorded on plural sheets by thermosensitive recording through thermal energy T1 and/or T2.

In the present invention, using a thermosensitive multiple recording sheet in which a third thermosensitive recording sheet is further formed on the second thermosensitive recording sheet 28 through the temporary adhesive layer in the same manner, the thermosensitive multiple recording sheet is subjected to thermosensitive recording, which enables the second thermosensitive recording sheet to develop no color but enables the third thermosensitive recording sheet to develop a color, through thermal energy T3, in addition to the above-described thermosensitive recording through thermal energy T1 and/or T2, and thus three different recordings can be obtained.

The method for producing an information recorded matter of the present invention is conducted by coating a solution containing a temporary adhesive onto the information recording layer of the first sheet or the second sheet to form a coated layer, laminating the first sheet with the second sheet through the coated layer while the coated layer is in a wet state, and drying the coated layer to form a temporary adhesive layer.

The information recorded matter of the present invention is produced by the method for producing an information recorded matter of the present invention.

The method for producing an information recorded matter of the present invention and an information recorded matter will now be described in more detail with reference to the accompanying drawings.

Figure 12:
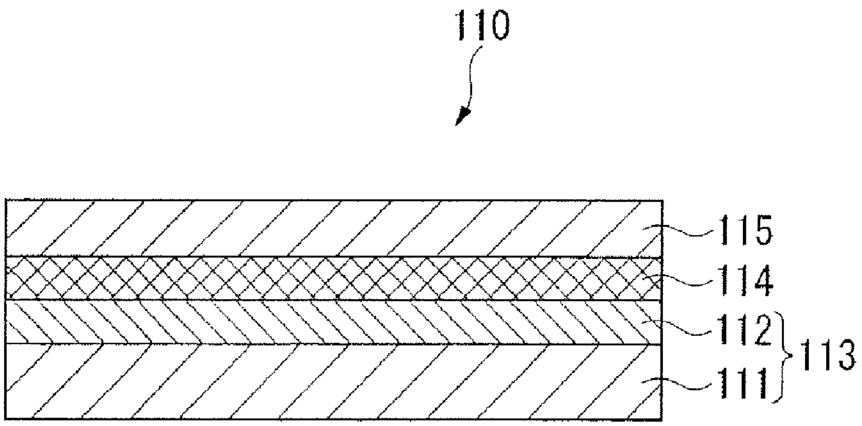
FIG. 12 is a sectional view showing an embodiment of an information recorded matter produced by the production method of the present invention.

FIG. 12 is a schematic sectional view showing the constitution of an information recorded matter produced by the first embodiment of the present invention. An information recorded matter 110 produced in the present embodiment comprises a first sheet 113 comprising a first base material 111 and an information recording layer 112 formed on one surface of the first base material 111, and a second sheet 115, the second sheet 115 being attached onto the information recording layer 112 of the first sheet 113 through a temporary adhesive layer 114.

The information recorded matter 110 can be produced by the following steps (1) to (2).

Step (1): step of preparing a first sheet 113 in which an information recording layer 112 including information recorded thereon is formed on one surface of a first base material 111.

Step (2): step of coating a coating solution containing a temporary adhesive onto an information recording layer 112 of a first sheet 113 to form a coated layer, attaching a second sheet 115 onto the coated layer while the coated layer is in a wet state, and drying the coated layer to form a temporary adhesive layer 114.

Each step will now be described.

Step (1)

The information recording layer 112 is usually formed by a recording system used in recording of information, and examples of the recording system include a system of recording on a sheet having recording aptitude to the recording system, using (1) a printing system, and (2) a pressure-sensitive recording system, a thermosensitive recording system, a thermal transfer recording system, an inkjet recording system or a magnetic recording system.

These recording systems may be used alone or in combination.

Among these recording systems, the printing system (1) is preferable because an information recording layer can be formed directly on a first base material and a predetermined pattern is easily formed at low cost.

Among the recording systems (2), an inkjet recording system or a thermal transfer recording system is preferably because it is excellent in immediateness as compared with printing. It is not necessary to previously produce a printing plate, a pattern can be changed immediately.

As the printing system (1), for example, a conventional system such as offset printing system, gravure printing system or flexography system can be applied.

In the system (2), the "sheet having recording aptitude" to be used varies depending on the recording system to be used.

In the inkjet recording system, a sheet which contains a porous pigment such as silica, and a binder added internally so as to be provided with ink absorptivity, and a sheet comprising a base material and a recording layer containing these components formed on the base material are used. To these sheets, a dye fixing agent is appropriately added so as to enhance water resistance of printing.

The porous pigment such as silica used herein preferably has an oil absorption amount of 100 ml/100 g or more is preferable and examples of the porous pigment include amorphous silica.

Examples of the binder include polyvinyl alcohol and cation-modified polyvinyll alcohol.

Examples of the dye fixing agent include cationic adsorbents such as polyethyleneimine, polyvinylpyridine, polydialkyl aminoethyl methacrylate.

In the thermal transfer recording system, in order to improve ink receiving properties, there can be used a sheet containing a porous pigment such as silica or synthetic aluminum silicate and the same binder as described above added internally, and a sheet comprising a base material and a recording layer containing these components formed on the base material are used.

In case of the sheet comprising a recording layer, the recording layer may be a single layer, or a multilayer comprising two or more layer having a different composition.

Information to be recorded on the information recording layer 112 is not specifically limited. For example, there can be recorded information described in various confidential postcards to a specific individual (for example, notice and claim of charges for public utilities such as electric, gas, water and telephone charges, and confidential information such as secret identification number or password) and fixed information described in various direct mails, which is common to many peoples (for example, various guides and catalogs given to customers from stores).

Step (2)

Then, the step (2) is conducted. In the step (2), a coating solution containing a temporary adhesive is coated onto an information recording layer 112 of a first sheet 113 to form a coated layer, and a second sheet 115 is attached onto the coated layer while the coated layer is in a wet state, and then the coated layer is dried to form a temporary adhesive layer 114. In the present invention, the temporary adhesive layer 14 is formed by the wet lamination method.

The wet lamination method has various advantages as compared with the above described dry lamination method. For example, lamination does not require large pressure. In the dry lamination method, contact-bonding must be conducted under pressure of about 20 kg/cm, whereas, the pressure is hardly required in the wet lamination method and temporary adhesion can be conducted even under pressure of about 1 kg/cm or less. As compared with the dry lamination method, the coating weight of the temporary adhesive layer 114 may be small. The production cost is low because of short time required to lamination or drying of the second sheet 115. Since large pressure is not required, a wide raw paper can be used in the production of the sheet. Therefore, mass production at high speed can be conducted, resulting in high productivity and low production cost.

The step (2) can be conducted using an apparatus used in the wet lamination method.

Figure 13:
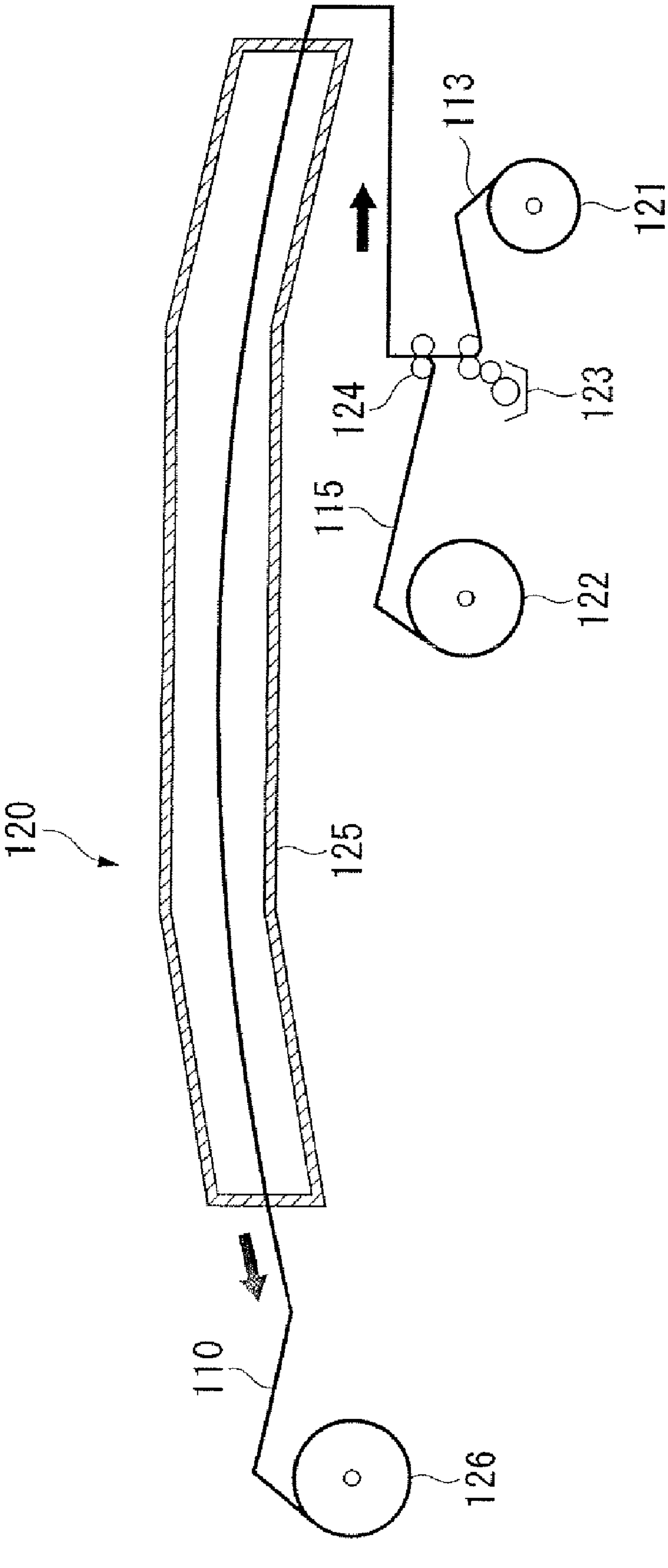
FIG. 13 is a schematic block diagram showing an example of an apparatus which can be used in the production method of the present invention.

FIG. 13 is a schematic block diagram showing an example of an apparatus which is suited for use in the step (2) in the present invention. This apparatus 120 basically comprises a feeding section 121, 122 for feeding a first sheet 113 or a second sheet 115; a coating section (roll coater) 123 for coating a coating solution; a lamination section 124 composed of two rolls (rubber roll and steel roll); a drying section 125; and a taking up section 126.

In this apparatus 120, the first sheet 113 is fed from the feeding section 121 and, in the coating section 123, a coating solution for forming a temporary adhesive layer (coating solution for forming temporary adhesive layer) is coated onto the surface of the side of information recording layer of the first sheet 113 to form a coated layer and, in the lamination section 124, the second sheet 115 is attached onto the coated layer while the coated layer is in a wet state. In the drying section 125, the resulting laminate is heated by hot air, thereby to dry the coated layer to form a temporary adhesive layer, and thus obtaining an information recorded matter 110. The resulting information recorded matter 110 is taken up in the taking up section 126.

The first sheet 113 may be replaced by the second sheet 115. That is, the information recorded matter 110 may be produced by feeding the first sheet 113 from the feeding section 122 and feeding the second sheet 115 from the feeding section 121.

The information recorded matter 110 thus obtained can be used for various purposes because of high security, that is, it is difficult to reattach after removing the first sheet 113 and the second sheet 115 through the temporary adhesive layer 114, and thus it is found whether or not a third party looked at information after removing the first sheet 113 and the second sheet 115 before the person having the right to know information recorded on the information record gets the information recorded matter.

It is particularly preferred that the information recorded matter 110 is used as various confidential postcards used for notice and claim of charges for public utilities such as electric, gas, water and telephone charges as well as postcards for various direct mails after recording various informations (for example, name and address of an individual to which information recorded in the information recording layer is given, and information with regard to a sender) on the surface of the information recorded matter 110.

In the present invention, an information recorded matter provided with a higher function can be obtained by further processing. For example, by coating an adhesive compound, a remoistening adhesive or a delayed tack adhesive compound onto the back surface of the first base material, the resulting product can be used as an adhesive paper, a remoistening adhesive paper or a delayed tack paper.

EXAMPLES

The present invention will now be described in more detail by way of examples, but the present invention is not limited to the following examples. In the following examples, parts and percentages are by weight unless otherwise specified.

Example 1

A thermosensitive multiple recording sheet with the constitution shown in FIGS. 3 and 4 was produced by the following procedure.

<Preparation of Thermosensitive Color Developing Component>

(1) Preparation of Solution A (Dispersion of Leuco Dye)

A composition comprising 20 parts of 3-di(n-butyl)amino-6-methyl-7-anilinofluoran, 5 parts of an aqueous 5% solution of methyl cellulose and 15 parts of water was ground by a sand mill until an average particle size of 1.0 μm is obtained.

(2) Preparation of Solution B (Dispersion of Developer)

A composition comprising 20 parts of bis(3-allyl-4-hydroxyphenyl)sulfone, 5 parts of an aqueous 5% solution of methyl cellulose and 15 parts of water was ground by a sand mill until an average particle size of 1.0 μm is obtained.

(3) Preparation of Solution C (Dispersion of Sensitizer)

A composition comprising 20 parts of 1,2-di(3-methylphenoxy)ethane, 5 parts of an aqueous 5% solution of methyl cellulose and 15 parts of water was ground by a sand mill until an average particle size of 1.0 μm is obtained.

<Preparation of Coating Solution for Thermosensitive Recording Layer>

60 Parts of a 30 mass % dispersion of silica (trade name: Mizukasil P-527, manufactured by Mizusawa Industrial Chemicals, Ltd.), 20 parts of a solution A, 50 parts of a solution B, 10 parts of a solution C, 13 parts of a water dispersion of zinc stearate (trade name: Highdrin Z-7-30, solid content: 31.5% by mass, manufactured by Chukyo Yushi Co., Ltd.), 40 parts of a SBR latex (trade name: L-1571, concentration: 48%, manufactured by Asahi Kasei Corporation) and 40 parts of an aqueous 10 mass % solution of a silicon-modified polyvinyl alcohol (trade name: R-1130, molecular weight: 1700, manufactured by Kuraray Co., Ltd.) were mixed with stirring to obtain a coating solution for thermosensitive recording layer.

<Production of First Thermosensitive Recording Sheet>

The coating solution for thermosensitive recording layer was coated onto one surface of a wood free paper (neutral paper) having a basis weight of 50 $g/m^2$ and a thickness of 62 μm and then dried in a dry coating weight of 5 $g/m^2$ to form a first thermosensitive recording layer, followed by super calendering to obtain a first thermosensitive recording sheet.

<Formation of Laminated Sheet>

A temporary adhesive paste (trade name: FULTAIT FB131 (vinyl acetate-based adhesive), active ingredient: 44% (balance component: water), manufactured by Mitsui Bussan Solvent & Coating Co., Ltd.) was coated onto the first thermosensitive recording layer in a dry coating weight of 2 $g/m^2$ by a gravure coater and a glassine paper (basis weight: 25 $g/m^2$, density: 0.92 $g/m^3$) as a second base material was attached onto the coated layer, followed by drying to obtain a laminated sheet (1) comprising a first thermosensitive recording sheet, a temporary adhesive layer and a second base material.

The coating solution for thermosensitive recording was coated onto the second base material of the resulting laminated sheet (1) in a dry coating weight of 5 $g/m^2$ by a gravure coater and dried to form a second thermosensitive recording layer, followed by super calendering to obtain a laminated sheet (2) comprising a first thermosensitive recording sheet, a temporary adhesive layer and a second thermosensitive recording sheet. At this time, the adhesive strength between the first thermosensitive recording sheet and the second thermosensitive recording sheet, as measured according to a T-type peeling test, was 480 mN/25 mm (peeling rate: 300 mm/min.).

<Formation of Shielding Layer>

On the first base material and the second thermosensitive recording layer of the resulting laminated sheet (2), a reticulate pattern of a printing rate of 90% was printed with a black ink by flexography to form a shielding layer having a shape shown in FIG. 3.

<Formation of Ultraviolet Curable Resin Layer>

On the first base material and the second thermosensitive recording layer of the laminated sheet (2) formed with the shielding layer, an ultraviolet curable resin layer having a shape shown in FIG. 4 was formed by whole area printing with an ultraviolet curable ink (trade name: UV MC-315 Varnish, manufactured by T&N TOKA Company) by flexography.

<Half-Cut Processing>

Then, the second thermosensitive recording sheet was subjected to half-cut processing to obtain a thermosensitive multiple recording sheet.

Example 2

Using the solutions A to C and the coating solution for thermosensitive recording layer prepared in Example 1, a thermosensitive multiple recording sheet with the constitution shown in FIGS. 1 and 2 was produced by the following procedure.

<Production of First Thermosensitive Recording Sheet>

The coating solution for thermosensitive recording layer was coated onto one surface of a wood free paper (neutral paper) having a basis weight of 50 $g/m^2$ and a thickness of 62 μm and dried in a dry coating weight of 5 $g/m^2$ to form a first thermosensitive recording layer, followed by super calendering to obtain a first thermosensitive recording sheet.

<Formation of Laminated Sheet>

A temporary adhesive paste (trade name: FULTAIT FB131 (vinyl acetate-based adhesive), active ingredient: 44% (balance component: water), manufactured by Mitsui Bussan Solvent & Coating Co., Ltd.) was coated onto the first thermosensitive recording layer in a dry coating weight of 2 $g/m^2$ by a gravure coater and a glassine paper (basis weight: 25 $g/m^2$, density: 0.92 $g/m^3$) as a second base material was attached onto the coated layer, followed by drying to obtain a laminated sheet (1) comprising a first thermosensitive recording sheets a temporary adhesive layer and a second base material. At this time, the adhesive strength between the first thermosensitive recording sheet and the second thermosensitive recording sheet, as measured according to a T-type peeling test, was 480 mN/25 mm (peeling rate: 300 mm/min.).

<Formation of Shielding Layer>

On the first base material and the second base material of the resulting laminated sheet (1), a reticulate pattern of a printing rate of 90% was printed with a black ink by flexography to form a shielding layer having a shape shown in FIG. 2.

<Formation of Ultraviolet Curable Resin Layer>

On the first base material and the second base material of the laminated sheet (1) formed with the shielding layer, an ultraviolet curable resin layer having a shape shown in FIG. 2 was formed by whole area printing with an ultraviolet curable ink (trade name: UV MC-315 Varnish, manufactured by T&K TOKA Company) by flexography.

<Half-Cut Processing>

Then, the second thermosensitive recording sheet was subjected to half-cut processing to obtain a thermosensitive multiple recording sheet.

Example 3

Using the solutions A to C and the coating solution for thermosensitive recording layer prepared in Example 1, a first thermosensitive recording sheet was produced in the same manner as in Example 1.

<<First Step: Production of Laminated Sheet Comprising First Thermosensitive Recording Sheet, Temporary Adhesive Layer and Second Base Material>>

Using a laminator, a temporary adhesive paste (manufactured by Mitsui Bussan Solvent & Coating Co., Ltd., FULTAIT FB2403, acrylic active ingredient: 33%) was coated onto a thermosensitive recording layer of a first thermosensitive recording sheet in a dry solid content of 2 $g/m^2$ by a gravure coater and then a glassine paper having a basis weight of 25 $g/m^2$ (density: 0.92 $g/m^3$) as a second base material was contact-bonded to obtain a laminated sheet comprising a first thermosensitive recording sheet, a temporary adhesive layer and a second base material.

<<Second Step: Production of Thermosensitive Multiple Recording Sheet>>

The coating solution for thermosensitive recording was coated onto the laminated sheet obtained in the first step in a dry coating weight of 5 $g/m^2$ by a gravure coater and dried to form a thermosensitive recording layer, followed by super calendaring to obtain a thermosensitive multiple recording sheet of Example 3. At this time, the adhesive strength as measured according to a T-type peeling test method was 480 mN/25 mm (testing speed: 300 mm/min.).

Example 4

In the same manner as in Example 3, except that a temporary adhesive paste (manufactured by Mitsui Bussan Solvent & Coating Co., Ltd., FULTAIT FB1708, rubber-based active ingredient: 30%) was used in place of the temporary adhesive paste (manufactured by Mitsui Bussan Solvent & Coating Co., Ltd., FULTAIT FB2403, acrylic active ingredient 33%) in <<First step: Production of laminated sheet comprising first thermosensitive recording sheet, temporary adhesive layer and second base material>> of Example 3, a thermosensitive multiple recording sheet of Example 4 was obtained. At this time, the adhesive strength as measured according to a T-type peeling test method was 320 mN/25 mm (testing speed: 300 mm/min.).

Example 5

In the same manner as in Example 3, except that, in <<First step: Production of laminated sheet comprising first thermosensitive recording sheet, temporary adhesive layer and second base material>> of Example 3, using a laminator, a temporary adhesive paste (manufactured by Mitsui Bussan Solvent & Coating Co., Ltd., FULTAIT FB131, vinyl acetate-based active ingredient: 44% (balance component: water)) was coated onto a thermosensitive recording layer of a first thermosensitive recording sheet in a dry solid content of 3 $g/m^2$ by a gravure coater and a glassine paper having a basis weight of 25 $g/m^2$ (density: 0.92 $g/m^3$) was contact-coated in an undried state, followed by drying to obtain a laminated sheet comprising a first thermosensitive recording sheet, a temporary adhesive layer and a second base material, a thermosensitive multiple recording sheet of Example 5 was obtained. At this time, the adhesive strength as measured according to a T-type peeling test method was 250 mN/25 mm (testing speed: 300 mm/min.).

Example 6

In the same manner as in Example 5, except that a temporary adhesive paste (manufactured by Mitsui Bussan Solvent & Coating Co., Ltd., FULTAIT FB131, vinyl acetate-based active ingredient: 44% (balance component: water)) was coated in a dry solid content of 4.3 $g/m^2$ in Example 5, a thermosensitive multiple recording sheet of Example 6 was obtained. At this time, the adhesive strength as measured according to a T-type peeling test method was 870 mN/25 mm (testing speed: 300 mm/min.).

Example 7

In the same manner as in Example 3, except that a polypropylene film having a basis weight of 25 $g/m^2$ (density: 0.93 $g/m^3$) was used in place of the glassine paper having a basis weight of 25 $g/m^2$ (density: 0.92 $g/m^3$) in Example 3, a thermosensitive multiple recording sheet of Example 7 was obtained. At this time, the adhesive strength as measured according to a T-type peeling test method was 550 mN/25 mm (testing speed: 300 mm/min.).

Example 8

In the same manner as in Example 5, except that a temporary adhesive paste (manufactured by Mitsui Bussan Solvent & Coating Co., Ltd., FULTAIT FB131, vinyl acetate-based active ingredient: 44% (balance component: water)) was coated in a dry solid content of 5.7 $g/m^2$ in Example 5, a thermosensitive multiple recording sheet of Example 8 was obtained At this time, the adhesive strength as measured according to a T-type peeling test method was 1300 mN/25 mm (testing speed: 300 mm/min.).

Example 9

In the same manner as in Example 5, except that a temporary adhesive paste (manufactured by Mitsui Bussan Solvent & Coating Co., Ltd., FULTAIT FB131, vinyl acetate-based active ingredient: 44% (balance component: water)) was coated in a dry solid content of 0.8 $g/m^2$ in Example 5, a thermosensitive multiple recording sheet of Example 9 was obtained. At this time, the adhesive strength as measured according to a T-type peeling test method was 42 mN/25 mm (testing speed: 300 mm/min.).

Comparative Example 1

The coating solution for thermosensitive recording was coated onto a glassine paper having a basis weight of 25 $g/m^2$ (density: 0.92 $g/m^3$) as a substrate (second base material) of an upper thermosensitive paper in a dry coating weight of 5 $g/m^2$ by a gravure coater. However, paper breakage and water absorption wrinkles occurred and thus a thermosensitive multiple recording sheet could not be obtained industrially.

Comparative Example 2

The coating solution for thermosensitive recording was coated onto a propylene film having a basis weight of 25 $g/m^2$ (density: 0.93 $g/m^3$) as a substrate (second base material) of an upper thermosensitive paper in a dry coating weight of 5 $g/m^2$ by a gravure coater. However, distortion, extension and wrinkles were caused by heat and thus a thermosensitive multiple recording sheet could not be obtained industrially.

<<Evaluation Results of Examples 3 to 9>>

In case of the resulting thermosensitive multiple recording sheets of Examples 3 to 7, wrinkles, surface waviness and thermal deformation of the second thermosensitive recording sheet did not occur and two sheets printed by a thermosensitive printer (Epson Corporation: M-165A) are removable with ease, and also clear and congruent recording could be obtained in both the second thermosensitive recording sheet and the first thermosensitive recording sheet. In Examples 5 and 6 in which the temporary adhesive was coated by the wet lamination method, not only the step of contact-bonding the first base material can be omitted and the rolled thermosensitive multiple recording sheet can be efficiently produced, but also vinyl acetate was used as the temporary adhesive, and thus it was a method having excellent productivity because the base material before coating the second thermosensitive recording layer is rigid and is easy to handle. In Example 8, the resulting sheet is slightly inferior in removability because of high adhesive strength as measured according to a T-type peeling test method and tear was observed at the limited portion in case of removing the upper thermosensitive paper, however, the sheet was in practice satisfactory. In Example 9, wrinkles due to peeling were observed at the limited portion through stress between rolls in case of coating the thermosensitive layer in the second step because of low adhesive strength as measured according to a T-type peeling test method, however, the sheet was in practice satisfactory.

Example 10

<<Preparation of Thermosensitive Color Developing Temporary Adhesive Paste>>

A composition comprising 100 parts of a temporary adhesive paste (trade name: FULTAIT FB131 (vinyl acetate-based adhesive), active ingredient: 44%, manufactured by Mitsui Bussan Solvent & Coating Co., Ltd.), 10 parts of a solution A, 20 parts of a solution B and 10 parts of a solution C was mixed with stirring to obtain a temporary adhesive paste.

<<Formation of Laminated Sheet (1)>>

Using a laminator, the temporary adhesive paste was coated onto a wood free paper (basis weight: 80 $g/m^2$, neutral paper) as a first base material in a dry solid content of 4 $g/m^2$ by a gravure coater and a glassine paper (basis weight: 25 $g/m^2$, density: 0.92 $g/m^3$) as a second base material was attached in an undried state of the coated layer, followed by drying to obtain a laminated sheet (1) comprising a first base material, a temporary adhesive layer and a second base material The adhesive strength between the first base material and the second base material, as measured according to a T-type peeling test, was 240 mN/25 mm (peeling rate: 300 mm/min.)

<Formation of Shielding Layer>

On the first base material and the second base material of the resulting laminated sheet (1), a reticulate pattern of a printing rate of 90% was printed with a black ink by flexography to form a shielding layer having a shape shown in FIG. 7.

<<Half-Cut Processing>>

Then, the portion of boundary between the shielding layer and the information displaying portion was subjected to half-cut processing to obtain a thermosensitive multiple recording sheet of the first embodiment shown in FIGS. 5 and 6.

Example 11

<<Preparation of Coating Solution for Thermosensitive Recording Layer>>

A composition comprising 60 parts of a 30% dispersion of silica (trade name: Mizukasil P-527, manufactured by Mizusawa Industrial Chemicals, Ltd.), 20 parts of a solution A, 50 parts of a solution B, 10 parts of a solution C, 13 parts of a water dispersion of zinc stearate (trade name: Highdrin Z-7-30, solid content: 31.5% by mass, manufactured by Chukyo Yushi Co., Ltd.), 40 parts of a SBR latex (trade name: L-1571, concentration: 48%, manufactured by Asahi Kasei Corporation) and 40 parts of an aqueous 10% solution of a silicon-modified polyvinyl alcohol (trade name: R-1130, molecular weight: 1700, manufactured by Kuraray Co., Ltd.) was mixed with stirring to obtain a coating solution for thermosensitive recording layer.

<<Production of Thermosensitive Multiple Recording Sheet>>

In the same manner as in Example 10, a laminated sheet (1) was produced and the coating solution for thermosensitive recording layer was coated onto the second base material of the laminated sheet (1) in a dry solid content of 5 $g/m^2$ by a gravure coater and dried to form a thermosensitive recording layer, followed by super calendering to obtain a laminated sheet (2). The adhesive strength between the first base material and the second base material, as measured according to a T-type peeling test, was 250 mN/25 mm (peeling rate: 300 mm/min.).

In the same manner as in Example 10, a shielding layer was formed on the resulting laminated sheet (2), followed by half-cut processing to obtain a thermosensitive multiple recording sheet of the second embodiment shown in FIGS. 7 and 8.

Example 12

In the same manner as in Example 10, except that the composition in <<Preparation of thermosensitive color developing temporary adhesive paste>> of Example 10 was replaced by a composition comprising 100 parts of a temporary adhesive paste (trade name: Kanebinol TV965 (dextrin-based adhesive), active ingredients: 16%, manufactured by Nippon NSC Ltd.), 5 parts of a solution A, 10 parts of a solution B and 5 parts of a solution C, a thermosensitive multiple recording sheet of the first embodiment was obtained. The adhesive strength between the first base material and the second base material, as measured according to a T-type peeling test, was 170 mN/25 mm (peeling rate: 300 mm/min.).

Example 13

The coating solution for thermosensitive recording layer prepared in Example 11 was coated onto the second base material of the thermosensitive multiple recording sheet of the first embodiment produced in Example 12 in a dry solid content of 5 $g/m^2$ by a gravure coater and dried to form a thermosensitive recording layer, followed by super calendering to obtain a thermosensitive multiple recording sheet of the second embodiment. The adhesive strength between the first base material and the second base material, as measured according to a T-type peeling test, was 190 mN/25 mm (peeling rate: 300 mm/min.).

Example 14

Figure 11:
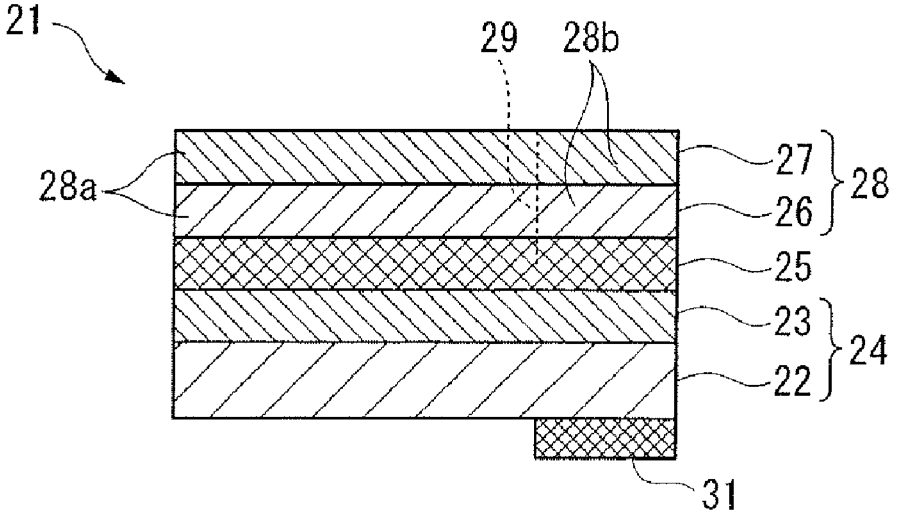
FIG. 11 is a longitudinal sectional view showing the other embodiment of a thermosensitive multiple recording sheet according to the present invention.

A thermosensitive multiple recording sheet with the constitution shown in FIG. 11 was produced by the following procedure.

<Preparation of Coating Solution for Thermosensitive Recording Layer for First Thermosensitive Recording Sheet>

A composition comprising 20 parts of a solution A, 50 parts of a solution B, 50 parts of a solution C, 20 parts of a SBR latex (trade name: L-1571, concentration: 48%, manufactured by Asahi Kasei Corporation) and 20 parts of an aqueous 10% solution of a silicon-modified polyvinyl alcohol (trade name: R-1130, molecular weight: 1700, manufactured by Kuraray Co., Ltd.) was mixed with stirring to obtain a coating solution for thermosensitive recording layer of a first thermosensitive recording sheet.

<Preparation of Coating Solution for Thermosensitive Recording Layer for Second Thermosensitive Recording Sheet>

A composition comprising 60 parts of a 30% dispersion of silica (trade name: Mizukasil P-527, manufactured by Mizusawa Industrial Chemicals, Ltd.), 20 parts of a solution A, 50 parts of a solution B, 10 parts of a solution C, 13 parts of a water dispersion of zinc stearate (trade name: Highdrin Z-7-30, solid content: 31.5%, manufactured by Chukyo Yushi Co., Ltd.), 40 parts of a SBR latex (trade name: L-1571, concentration: 48%, manufactured by Asahi Kasei Corporation) and 40 parts of an aqueous 10% solution of a silicon-modified polyvinyl alcohol (trade name: R-1130, molecular weight: 1700, manufactured by Kuraray Co., Ltd.) was mixed with stirring to obtain a coating solution for thermosensitive recording layer of a second thermosensitive recording sheet.

<Production of the First Thermosensitive Recording Sheet>

The coating solution for thermosensitive recording layer for first thermosensitive recording sheet was coated onto one surface of a wood free paper (neutral paper) having a basis weight of 50 g/$m^2$ and a thickness of 62 μm in a dry coating weight of 4 g/$m^2$ by a gravure coater and dried to form a first thermosensitive recording layer, followed by super calendering to obtain a first thermosensitive recording sheet.

<Formation of Laminated Sheet>

A temporary adhesive paste (trade name: FULTAIT FB131 (vinyl acetate-based adhesive), active ingredient: 44% (balance component: water), manufactured by Mitsui Bussan Solvent & Coating Co., Ltd.)) was coated onto the first thermosensitive recording layer in a dry coating weight of 2 g/$m^2$ by a gravure coater and a glassine paper (basis weight: 25 g/$m^2$, density: 0.92 g/$m^3$) as a second base material was attached onto the coated layer, followed by drying to obtain a laminated sheet (1) comprising a first thermosensitive recording sheet, a temporary adhesive layer and a second base material.

The coating solution for thermosensitive recording for second thermosensitive recording sheet was coated onto the second base material of the resulting laminated sheet (1) in a dry coating weight of 5 g/$m^2$ by a gravure coater and dried to form a second thermosensitive recording layer, followed by super calendaring to obtain a laminated sheet (2) comprising a first thermosensitive recording sheet, a temporary adhesive layer and a second thermosensitive recording sheet. At this time, the adhesive strength between the first thermosensitive recording sheet and the second thermosensitive recording sheet, as measured according to a T-type peeling test, was 480 mN/25 mm (peeling rate: 300 mm/min.).

<Formation of Shielding Layer>

On the first base material of the resulting laminated sheet (2), a reticulate pattern of a printing rate of 90% was printed with a black ink by flexography to form a shielding layer.

<Half-Cut Processing>

Then, the portion of boundary between the portion for displaying information of the second thermosensitive recording sheet (information displaying portion) and the portion at which a blindfolding printing portion is formed (the portion corresponding to the shielding layer) to obtain a thermosensitive multiple recording sheet.

Production Example 1

Using the thermosensitive multiple recording sheet obtained in Example 14 and using the following printer and printing conditions, a thermosensitive recorded matter was produced by the following procedure.

Printer: Barlabe 300, manufactured by Sato Corporation

Printing conditions: printing rate; 3 inch/sec, dot density; 8/mm (203 dpi)

Recording was conducted on the thermosensitive multiple recording sheet at printing energy (thermal energy T1) of 0.327 mJ/dot and solid printing was conducted at the portion, at which a blindfolding printing portion of the second thermosensitive recording sheet is formed, to form the blindfolding printing portion, and also address printing was conducted at the information displaying portion. Then, recording was conducted on the thermosensitive multiple recording sheet at printing energy (thermal energy T2) of 0.537 mJ/dot and a numeral (non-disclosed numeral) as non-disclosed information was printed at the portion under the blindfolding printing portion of the first thermosensitive recording sheet to obtain an information recorded matter.

After printing, the numeral under the blindfolding printing portion was not visible. The first thermosensitive recording sheet was removed from the second thermosensitive recording sheet. As a result, only the non-disclosed numeral was recorded on the first thermosensitive recording sheet.

Production Example 2

The same treatment as in Production Example 1 was conducted, except that recording at thermal energy T1 and recording at thermal energy T2 were conducted in reverse order. As a result, the same information recorded matter as in Production Example 1 was obtained.

Production Example 3

The same treatment as in Production Example 1 was conducted, except that recording at thermal energy T1 and recording at thermal energy T2 were simultaneously conducted. As a result, the same information recorded matter as in Production Example 1 was obtained.

Example 15

On one surface of a wood free paper having a paper width of 1100 mm and a basis weight of 80 g/$cm^2$, printing including information to be given to a specified customer was conducted by an offset printing method to obtain a first sheet. Using a wet laminator, a temporary adhesive paste (trade name: FULTAIT FB131 (vinyl acetate-based adhesive), active ingredient: 44% (balance component: water), manufactured by Mitsui Bussan Solvent & Coating Co., Ltd.)) was coated onto the printed surface of the first sheet in a coating weight of 2 g/$m^2$ by a gravure coater and then a second sheet (wood free paper having a basis weight of 65 g/$m^2$) was attached onto the coated layer in an undried state, followed by drying to obtain an information recorded matter. At this time, the production rate was 200 m/min. The adhesive strength between the first sheet and the second sheet, as measured according to a T-type peeling test, was 280 mN/25 mm (peeling rate: 300 mm/min.).

After recording an address on the second sheet of the resulting information recorded matter by an inkjet printer, the information recorded matter was planar-cut into an A4 size to obtain a personal information recorded matter including the above information as blindfolding information therein.

Example 16

On one surface of a wood free paper having a paper width of 1100 mm and a basis weight of 80 g/$cm^2$, private information was recorded by an inkjet recording method to obtain a first sheet Using a wet laminator, a temporary adhesive paste (trade name: FULTAIT FB131 (vinyl acetate-based adhesive), active ingredient: 44% (balance component: water)), manufactured by Mitsui Bussan Solvent & Coating Co., Ltd.)) was coated onto the recorded surface of the first sheet in a coating weight of 2 g/$m^2$ by a gravure coater and a second sheet (wood free paper having a basis weight of 65 g/$m^2$) was attached onto the coated layer in an undried state, followed by drying to obtain an information recorded matter. At this time, the production rate was 200 m/min. The adhesive strength between the first sheet and the second sheet, as measured according to a T-type peeling test, was 250 mN/25 mm (peeling rate: 300 mm/min.).

After recording an address on the second sheet of the resulting information recorded matter by an inkjet printers the information recorded matter was planar-cut into an A4 size to obtain a personal information recorded matter including the above information as blindfolding information therein.

Example 17

In the same manner as in Example 15, except that the temporary adhesive paste (trade name: FULTAIT FB131 (vinyl acetate-based adhesive), active ingredient: 44%, manufactured by Mitsui Bussan Solvent & Coating Co., Ltd.)) of Example 1 was replaced by a temporary adhesive paste (trade name: Kanebinol TV965 (dextrin-based adhesive), active ingredient: 16% (balance component: water), manufactured by Nippon NSC Ltd.)), an information recorded matter was obtained. At this time, the production rate was 200 m/min. The adhesive strength between the first sheet and the second sheet, as measured according to a T-type peeling test, was 150 mN/25 mm (peeling rate: 300 mm/min.).

According to the present invention, there can be provided a thermosensitive multiple recording sheet which can simultaneously conduct thermosensitive recording of disclosed information and non-disclosed information and is also excellent in productivity and is produced at low production cost.

In the thermosensitive multiple recording sheet of the present invention, disclosed information recorded on the first thermosensitive recording layer is displayed at the information disclosing portion and non-disclosed information recorded on the first thermosensitive recording layer is not visible from the outside due to the shielding layer. Therefore, it is possible to simultaneously performing thermosensitive recording of disclosed information and non-disclosed information to the thermosensitive multiple recording sheet of the present invention.

The thermosensitive multiple recording sheet of the present invention can be easily formed into a roll shape by laminating the second base material onto the first thermosensitive recording layer through the temporary adhesive layer, and is also excellent in productivity. Since the thermosensitive multiple recording sheet can be formed into a roll shape, it is easy to dispose a mounting tray of the thermosensitive multiple recording sheet before recording and to perform continuous printing in a recording apparatus used for recording onto the thermosensitive multiple recording sheet.

Furthermore, the thermosensitive multiple recording sheet of the present invention is excellent in security to confidential information. That is, since the second base material is laminated onto the first thermosensitive recording layer through the temporary adhesive layer, the second base material once removed is not reattached with ease, and thus it is found whether or not someone else looked at confidential information such as secret identification number or password after removing the non-disclosing portion of the second base material before the person himself confirms the confidential information.

There can be provided a method for producing a thermosensitive multiple recording material without causing wrinkles in case of producing using a second base material having a basis weight of 5 to 40 g/$m^2$ (a density of 0.85 to 1.3 g/$cm^3$ in case of a paper base material, or a density of 0.9 to 1.6 g/$cm^3$ in case of a film substrate), and the resulting thermosensitive multiple recording material can be applied to receipts, slips and memos which require simultaneous recording of plural sheets.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims.

What is claimed is:

1. A method for producing a thermosensitive multiple recording sheet by laying at least two thermosensitive recording sheets one upon another comprising:

attaching a paper or film second base material having a basis weight of 5 to 40 g/$m^2$ and a density of 0.85 to 1.3 g/$cm^3$ in case of a paper second base material or a density of 0.9 to 1.6 g/$cm^3$ in case of a film second base material onto a side of a recording layer of a first thermosensitive recording sheet which comprises a first base material, through a temporary adhesive layer to obtain a laminated sheet comprising the first thermosensitive recording sheet, the temporary adhesive layer and the second base material; and forming a thermosensitive recording layer on the surface of the second base material in the laminated sheet to form a second thermosensitive recording sheet laminated on the first thermosensitive recording sheet, wherein said attaching comprises:

coating a coating liquid containing a temporary adhesive in a dissolved or a emulsified state in a vehicle onto the first thermosensitive recording sheet or the second base material at a coating weight of 1-5 g/$m^2$ while the coated layer is in a wet state;

laminating the first thermosensitive recording sheet and the second base material through the coating liquid; and drying the coating liquid under a pressure of about 1 kg/cm or less after laminating the second base material.

2. The method for producing a thermosensitive multiple recording sheet according to claim 1, wherein the first base material has a thickness of 40 to 100 μm.

3. The method for producing a thermosensitive multiple recording sheet according to claim 1, wherein the temporary adhesive layer is an adhesive layer made of a vinyl acetate-based adhesive.

4. The method for producing a thermosensitive multiple recording sheet according to claim 1, wherein an adhesive strength between the first thermosensitive recording sheet and the second thermosensitive recording sheet bonded using a temporary adhesive, as measured according to a T-type peeling test method defined in ISO 11339: 2003, is from 50 to 1000 mN/25 mm (testing speed: 300 mm/min.).

5. A method for producing a thermosensitive multiple recording sheet by laying at least two thermosensitive recording sheets one upon another, comprising:

attaching a second base material onto a side of a recording layer of a first thermosensitive recording sheet which comprises a first base material, through a temporary adhesive layer to obtain a laminated sheet comprising the first thermosensitive recording sheet, the temporary adhesive layer and the second base material;

forming a thermosensitive recording layer on the surface of the second base material in the laminated sheet to form a second thermosensitive recording sheet laminated on the first thermosensitive recording sheet;

subjecting the thermosensitive multiple recording sheet to thermosensitive recording through thermal energy T1, which enables the second thermosensitive recording layer to develop a color and also enables the first thermosensitive recording layer to develop no color, from the second thermosensitive recording layer of the thermosensitive multiple recording sheet, thereby to record a recording A on the second thermosensitive recording layer, and subjecting the thermosensitive multiple recording sheet to thermosensitive recording through thermal energy T2, which enables the first thermosensitive recording layer to develop a color, from the side of the second thermosensitive recording layer of the thermosensitive multiple recording sheet, thereby to record a recording B, which is different from the recording A, on the first thermosensitive recording layer.

6. The method for producing a thermosensitive recorded sheet according to claim 5, wherein the recording A is a blindfolding printing portion.

7. The method for producing a thermosensitive recorded sheet according to claim 5, wherein the temporary adhesive layer is formed by coating a coating solution containing a temporary adhesive onto the first thermosensitive recording layer or the second base material, and laminating the first thermosensitive recording layer and the second base material, followed by drying.

8. The method for producing a thermosensitive multiple recording sheet according to claim 1, wherein the second base material is composed of an information disclosing portion and an information non-disclosing portion, and a shielding layer is formed at the position corresponding to the information non-disclosing portion on the second base material.

9. The method for producing a thermosensitive multiple recording sheet according to claim 1, wherein the second base material is composed of an information disclosing portion and an information non-disclosing portion, and a shielding layer is formed at the position corresponding to the information non-disclosing portion on the second thermosensitive recording sheet.

10. The method for producing a thermosensitive multiple recording sheet according to claim 1, wherein the second base material having light transmission properties is attached onto a first base material through a temporary adhesive layer, the temporary adhesive layer contains a reactive dye and a developer, the second base material is composed of an information disclosing portion and an information non-disclosing portion, and the information disclosing portion is cut or cuttable from the information non-disclosing portion, and a shielding layer is formed at the position corresponding to the information non-disclosing portion on the second base material.

11. The method according to claim 1, wherein the temporary adhesive layer contains a reactive dye and a developer, the second thermosensitive recording sheet is composed of an information disclosing portion and an information non-disclosing portion, and the information disclosing portion is cut or cuttable from the information non-disclosing portion, and a shielding layer is formed at the position corresponding to the information non-disclosing portion on the second thermosensitive recording sheet.

12. The method according to claim 1, wherein the vehicle is water.

* * * * *